(12) United States Patent
Takatsu et al.

(10) Patent No.: US 9,455,970 B2
(45) Date of Patent: Sep. 27, 2016

(54) INFORMATION PROCESSING SYSTEM, INFORMATION PROCESSING APPARATUS, AND AUTHENTICATION METHOD

(71) Applicants: Kazunori Takatsu, Kanagawa (JP); Naotoshi Seo, Tokyo (JP); Noriko Kota, Kanagawa (JP)

(72) Inventors: Kazunori Takatsu, Kanagawa (JP); Naotoshi Seo, Tokyo (JP); Noriko Kota, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 166 days.

(21) Appl. No.: 13/753,670

(22) Filed: Jan. 30, 2013

(65) Prior Publication Data

US 2013/0198806 A1    Aug. 1, 2013

(30) Foreign Application Priority Data

Feb. 1, 2012 (JP) ................... 2012-020251
May 15, 2012 (JP) ................... 2012-111681
Jan. 9, 2013 (JP) ................... 2013-001609

(51) Int. Cl.
*H04L 29/06* (2006.01)
*G06F 3/12* (2006.01)
*G06F 21/60* (2013.01)

(52) U.S. Cl.
CPC ............ *H04L 63/08* (2013.01); *G06F 3/1222* (2013.01); *G06F 3/1238* (2013.01); *G06F 3/1267* (2013.01); *G06F 3/1288* (2013.01); *G06F 21/608* (2013.01)

(58) Field of Classification Search
CPC .. G06F 3/1222; G06F 3/1238; G06F 3/1288; G06F 21/608; H04L 63/08

USPC .......................... 726/2–5; 713/168; 358/1.15
See application file for complete search history.

(56) References Cited

U.S. PATENT DOCUMENTS 5,675,782 A * 10/1997 Montague et al. ................ 726/4
6,163,383 A * 12/2000 Ota et al. ........................ 358/1.1
6,711,677 B1 * 3/2004 Wiegley ........................ 713/151
(Continued)

FOREIGN PATENT DOCUMENTS

EP    2 136 532 A2    12/2009
JP    2007-048080    2/2007
(Continued)

OTHER PUBLICATIONS http://en.wikipedia.org/wiki/X.509, Aug. 2014.*
(Continued)

*Primary Examiner* — Kambiz Zand
*Assistant Examiner* — Tongoc Tran
(74) *Attorney, Agent, or Firm* — IPUSA, PLLC

(57) ABSTRACT

An information processing system, which is implemented by one or more information processing apparatuses, includes a first receiving unit configured to receive a first user identifier and a first organization identifier via a network from an external apparatus and a first authentication unit configured to perform authentication based on the first user identifier and the first organization identifier by referring to a storage unit storing one or more second user identifiers in association with second organization identifiers. The first authentication unit performs authentication by identifying an organization identifier matching the first organization identifier within the second organization identifiers and identifying a user identifier matching the first user identifier within the second user identifiers associated with the matching organization identifier.

10 Claims, 21 Drawing Sheets

(56) References Cited

U.S. PATENT DOCUMENTS

| | | | |
|---|---|---|---|
| 6,795,205 B1* | 9/2004 | Gacek | 358/1.15 |
| 6,882,439 B2* | 4/2005 | Ishijima | 358/1.15 |
| 7,158,623 B1* | 1/2007 | D'Silva et al. | 379/201.01 |
| 8,189,225 B1* | 5/2012 | Lo et al. | 358/1.15 |
| 8,516,579 B2* | 8/2013 | Nagasaki et al. | 726/22 |
| 8,526,037 B2* | 9/2013 | Emori et al. | 358/1.15 |
| 2002/0038420 A1* | 3/2002 | Collins et al. | 713/156 |
| 2002/0062453 A1* | 5/2002 | Koga | 713/202 |
| 2002/0161830 A1* | 10/2002 | Mukaiyama et al. | 709/203 |
| 2003/0061358 A1* | 3/2003 | Piazza et al. | 709/227 |
| 2005/0162687 A1* | 7/2005 | Lee | 358/1.15 |
| 2005/0268330 A1* | 12/2005 | Di Rienzo | 726/4 |
| 2006/0072541 A1* | 4/2006 | Pecus | 370/351 |
| 2007/0027990 A1* | 2/2007 | Nakaoka et al. | 709/226 |
| 2007/0130130 A1* | 6/2007 | Chan et al. | 707/3 |
| 2008/0117451 A1* | 5/2008 | Wang | 358/1.15 |
| 2008/0174808 A1 | 7/2008 | Singh et al. | |
| 2008/0189250 A1* | 8/2008 | Cha et al. | 707/3 |
| 2008/0195730 A1* | 8/2008 | Hasegawa et al. | 709/224 |
| 2009/0030906 A1* | 1/2009 | Doshi et al. | 707/9 |
| 2009/0185223 A1* | 7/2009 | Kanai et al. | 358/1.15 |
| 2011/0154452 A1* | 6/2011 | Novack et al. | 726/5 |
| 2013/0067547 A1* | 3/2013 | Thavasi et al. | 726/7 |
| 2013/0188221 A1* | 7/2013 | Ohno | 358/1.15 |
| 2015/0074670 A1* | 3/2015 | Gerganov | 718/103 |

FOREIGN PATENT DOCUMENTS

| | | |
|---|---|---|
| JP | 2008-182699 | 8/2008 |
| JP | 2010-231765 | 10/2010 |

OTHER PUBLICATIONS

Extended European search report dated Apr. 8, 2014.

* cited by examiner

FIG.4A

| COMPANY ID | COMPANY NAME | USER ID | USER NAME | PASSWORD |
|---|---|---|---|---|
| 1234 | COMPANY A | 123 | USER A | 1234 |
| 1235 | COMPANY B | 124 | USER B | 1235 |
| 1236 | COMPANY C | 125 | USER C | 1236 |
| 1237 | COMPANY D | 126 | USER D | 1237 |
| 1238 | COMPANY E | 127 | USER E | 1238 |

FIG.4B

| COMPANY ID | DEVICE ID |
|---|---|
| 1234 | 123456 |
| 1234 | 123481 |
| 1234 | 123493 |
| ⋮ | ⋮ |
|  |  |

FIG.4C

| BASIC AUTHENTICATION CODE |
|---|
| 12345abcde6789 |

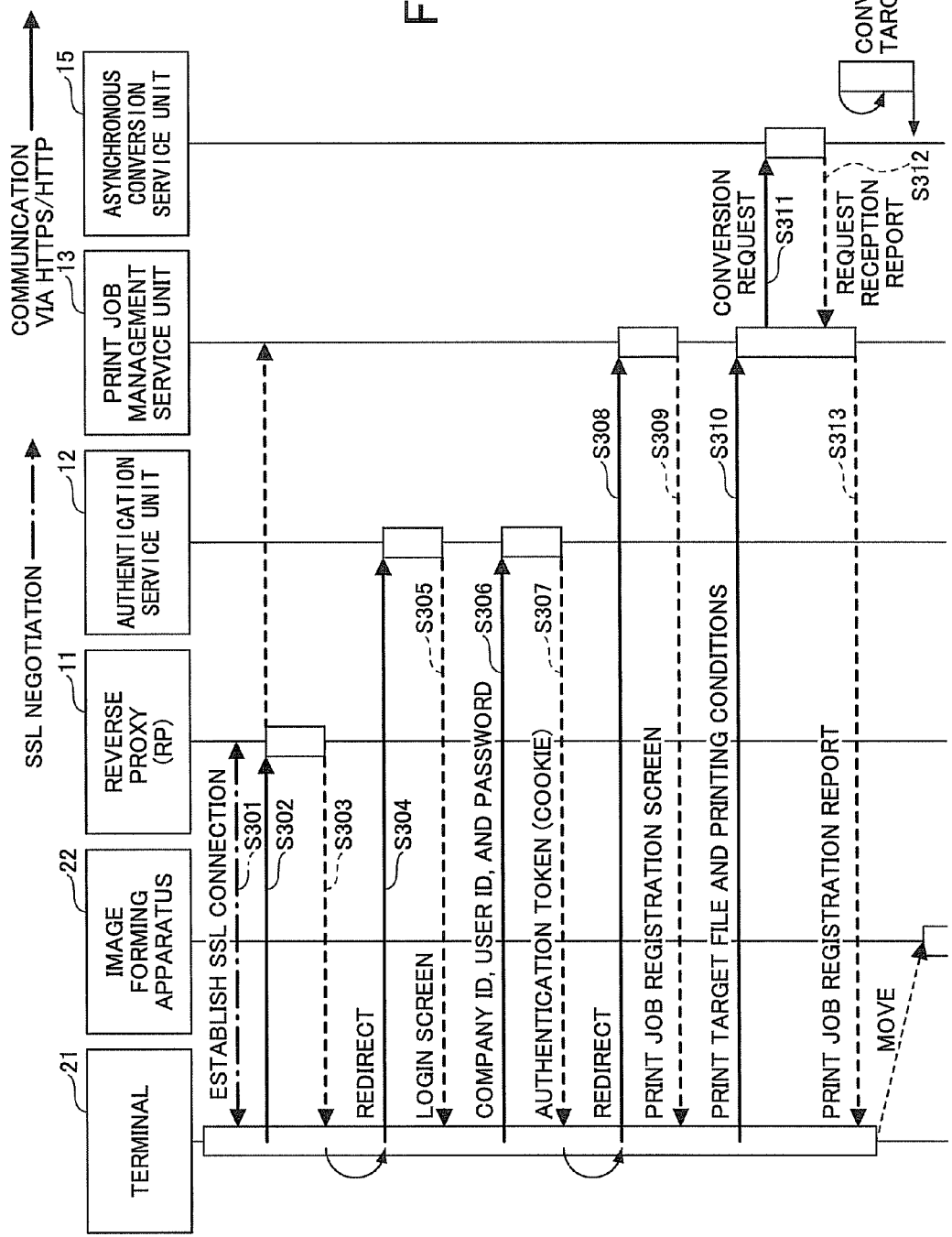

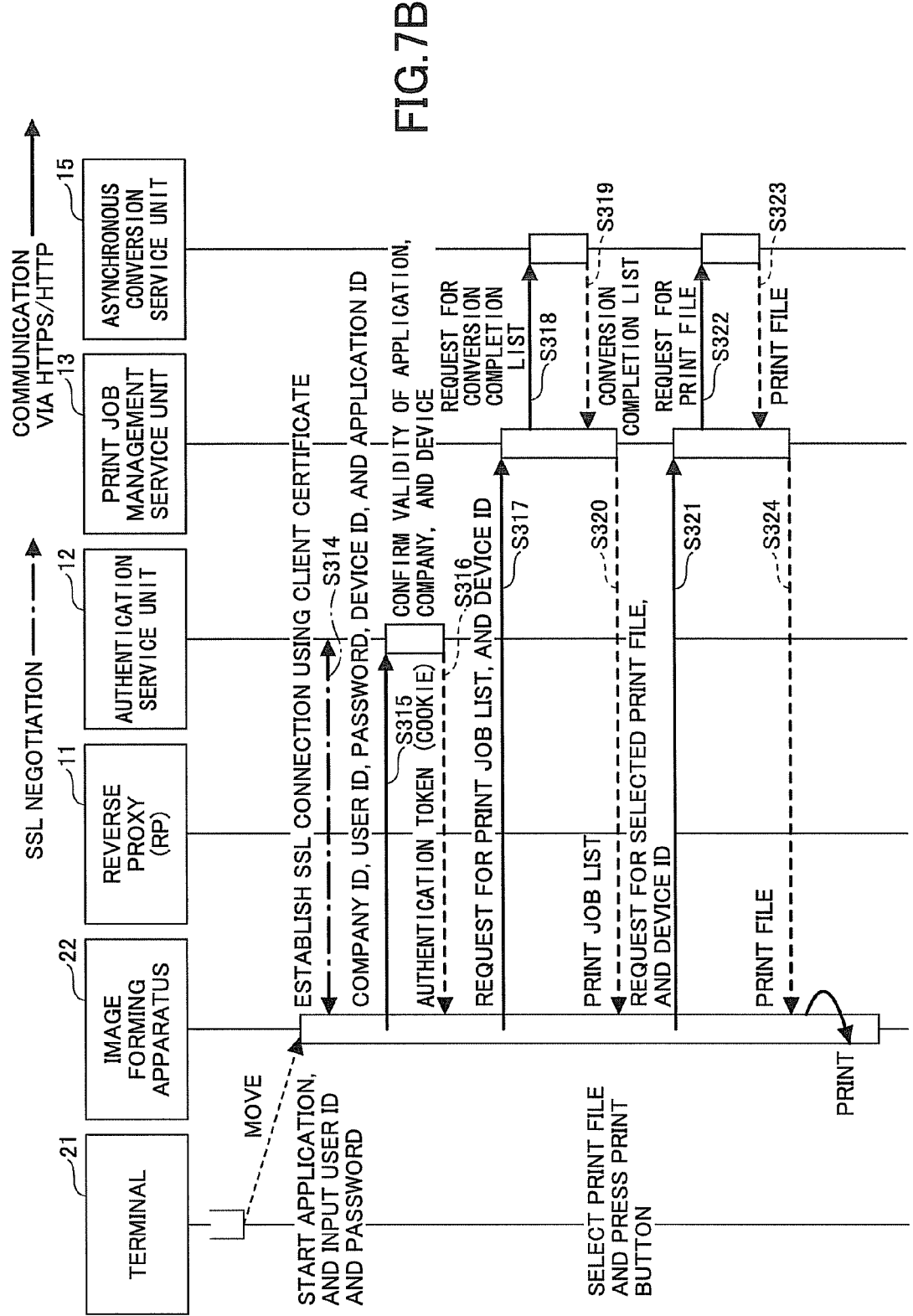

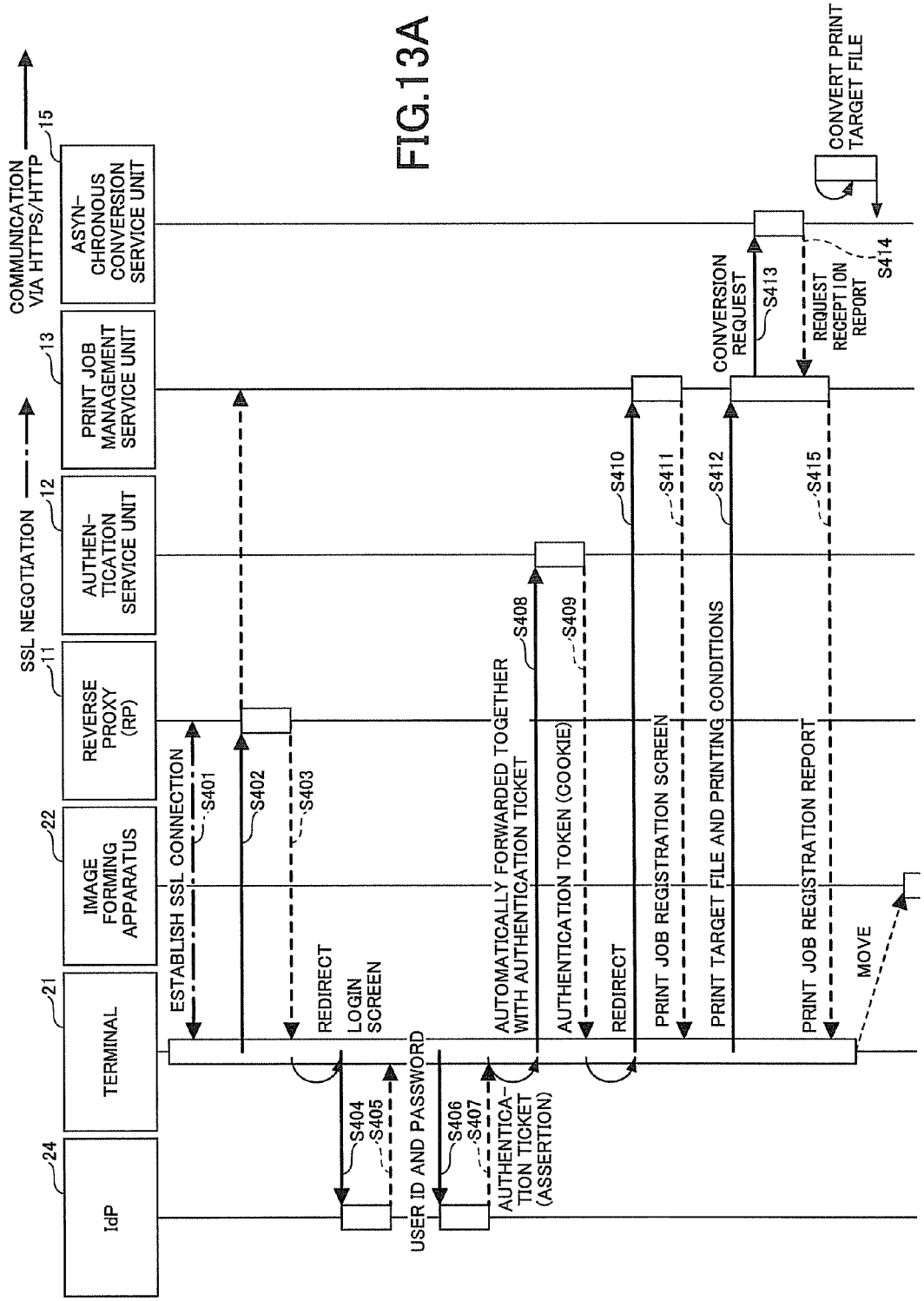

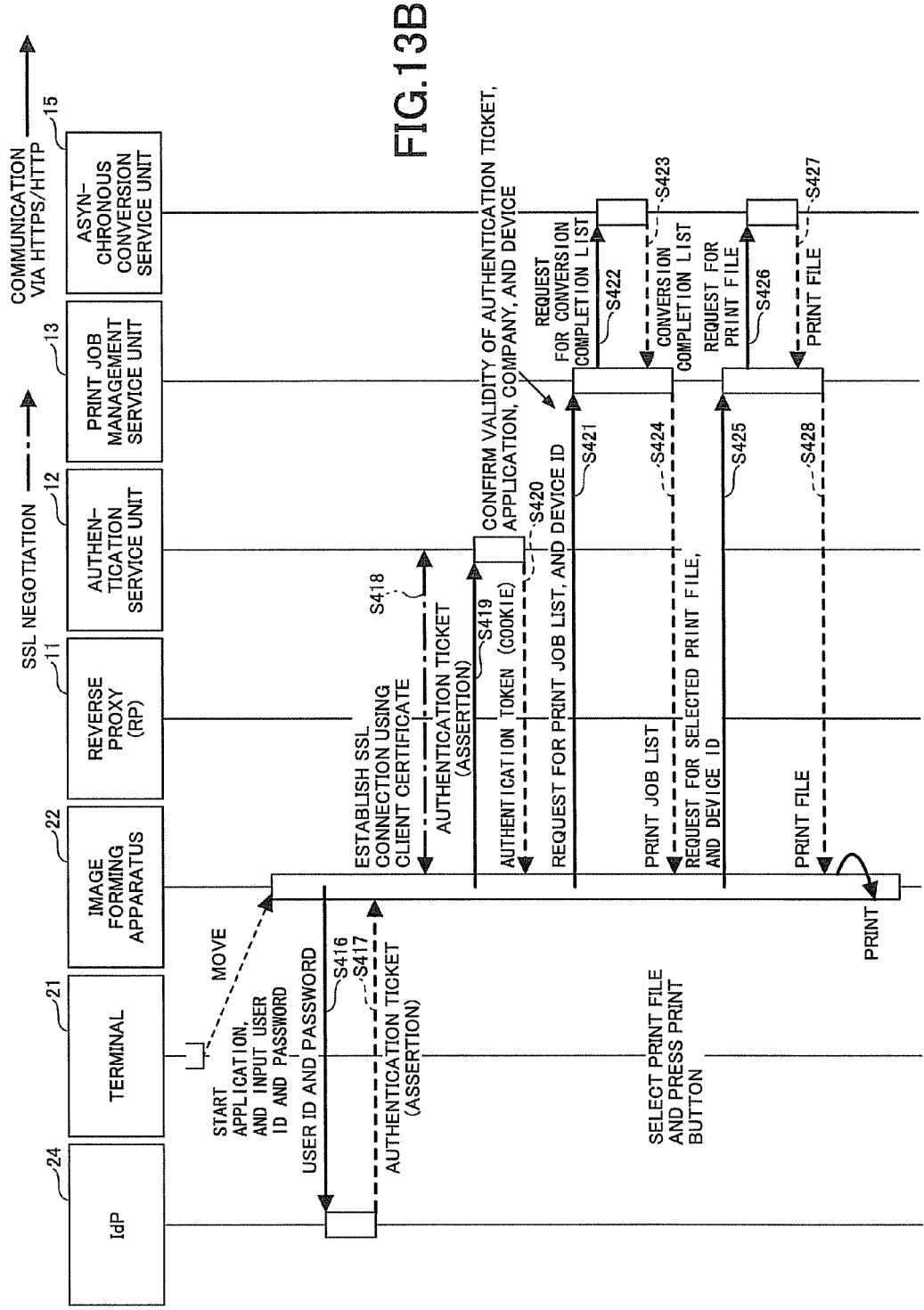

FIG.15A

| COMPANY ID | COMPANY NAME | USER ID | USER NAME | PASSWORD |
|---|---|---|---|---|
| 1234 | COMPANY A | 123 | USER A | 1234 |
| 1235 | COMPANY B | 124 | USER B | 1235 |
| 1236 | COMPANY C | 125 | USER C | 1236 |
| 1237 | COMPANY D | 126 | USER D | 1237 |
| 1238 | COMPANY E | 127 | USER E | 1238 |

FIG.15B

| COMPANY ID | DEVICE ID |
|---|---|
| 1234 | 123456 |
| 1234 | 123481 |
| 1234 | 123493 |
| ⋮ | ⋮ |
| | |

FIG.15C

| BASIC AUTHENTICATION CODE |
|---|
| 12345abcde6789 |

FIG.15D

| CORPORATE GROUP ID | COMPANY ID | COMPANY ID | COMPANY ID | ... |
|---|---|---|---|---|
| G01 | 1234 | 1235 | 1236 | ... |
| G02 | 1237 | | | |
| ⋮ | | | | ⋮ |

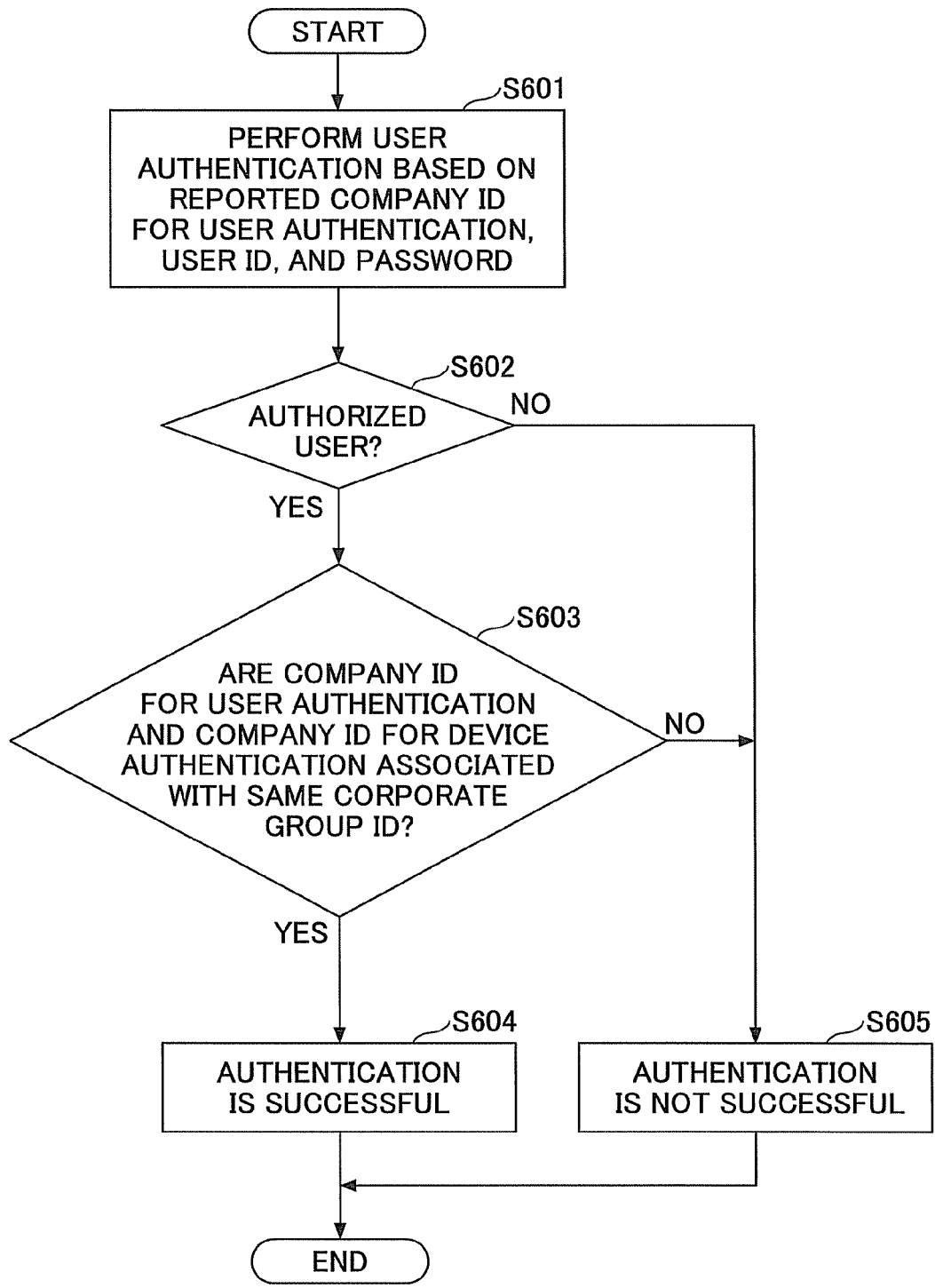

INFORMATION PROCESSING SYSTEM, INFORMATION PROCESSING APPARATUS, AND AUTHENTICATION METHOD

CROSS-REFERENCE TO RELATED APPLICATIONS

The present application is based upon and claims the benefit of priority of Japanese Patent Application No. 2012-020251 filed on Feb. 1, 2012, Japanese Patent Application No. 2012-111681 filed on May 15, 2012, and Japanese Patent Application No. 2013-001609 filed on Jan. 9, 2013, the entire contents of which are incorporated herein by reference.

BACKGROUND OF THE INVENTION

1. Field of the Invention

An aspect of this disclosure relates to an information processing system, an information processing apparatus, and an authentication method.

2. Description of the Related Art Japanese Laid-Open Patent Publication No. 2008-182699, for example, discloses a printing system where print jobs received from terminals such as personal computers (PC) are not immediately printed but stored in an information processing apparatus such as a print server, and a logged-in user selects a print job from a list of the stored print jobs and prints the selected print job on an image forming apparatus such as a multi-function peripheral. Such a printing system or method is called a "pull-printing system" or method (see, for example, Japanese Laid-Open Patent Publication No. 2008-182699).

In the related-art pull-printing system as described above, user authentication is normally performed to maintain information security when a user prints a print job stored in an information processing apparatus (e.g., print server) on an image forming apparatus (e.g., multifunction peripheral). For example, a user ID and a password are used to authenticate the user.

In the related-art pull-printing system, however, if the user ID and the password are stolen by a third party, the third party can execute print jobs stored in the image processing apparatus on any image forming apparatus (which is installed, for example, in a company of the third party or a public environment such as a convenience store) using the stolen user ID and password.

Thus, with the related-art pull-printing system, it is difficult to prevent leakage of information to a third party impersonating an authorized user using a stolen user ID and password and therefore it is difficult to maintain security.

SUMMARY OF THE INVENTION

In an aspect of this disclosure, there is provided an information processing system implemented by one or more information processing apparatuses. The information processing system includes a first receiving unit configured to receive a first user identifier and a first organization identifier via a network from an external apparatus and a first authentication unit configured to perform authentication based on the first user identifier and the first organization identifier by referring to a storage unit storing one or more second user identifiers in association with second organization identifiers. The first authentication unit performs authentication by identifying an organization identifier matching the first organization identifier within the second organization identifiers and identifying a user identifier matching the first user identifier within the second user identifiers associated with the matching organization identifier.

BRIEF DESCRIPTION OF THE DRAWINGS

FIGS. 4A through 4C are exemplary tables registered in an authentication DB;

FIGS. 7A and 7B are parts of a sequence chart illustrating an exemplary print job registration process and an exemplary printing process according to the first embodiment;

FIGS. 13A and 13B are parts of a sequence chart illustrating an exemplary print job registration process and an exemplary printing process according to the second embodiment;

FIGS. 15A through 15D are exemplary tables registered in an authentication DB according to the third embodiment;

FIG. 17 is a flowchart illustrating another exemplary user authentication process.

DESCRIPTION OF THE PREFERRED EMBODIMENTS

Preferred embodiments of the present invention are described below with reference to the accompanying drawings. In the embodiments, a printing system supporting pull-printing is used as an example of an output system.

<<First Embodiment>>

<Configuration of Printing System>

Figure 1:
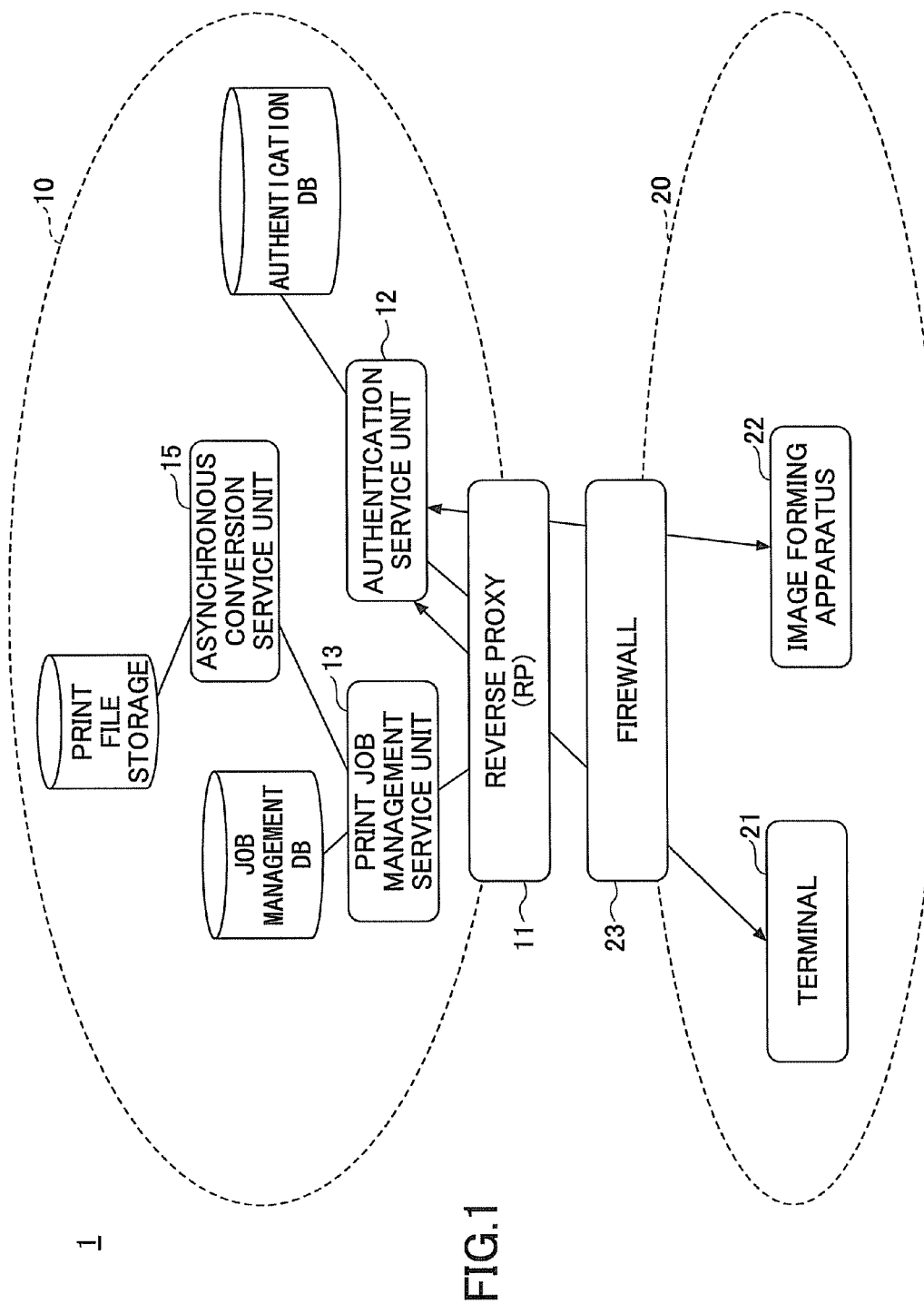
FIG. 1 is a drawing illustrating an exemplary configuration of a printing system according to a first embodiment.

FIG. 1 is a drawing illustrating an exemplary configuration of a printing system 1 according to a first embodiment. As illustrated in FIG. 1, the printing system 1 may include a network 10 providing a cloud service and a network 20 representing an internal network of, for example, a company. The network 10 and the network 20 are connected to each other via a reverse proxy 11 of the network 10, an external network such as the Internet, and a firewall 23 of the network 20.

The reverse proxy 11 is provided at a node between the network 10 and the external network (e.g., the Internet) and relays access from the external network to the inside of the network 10. The firewall 23 is provided at a node between the network 20 and the external network and relays access from the inside of the network 20 to the external network.

The network 10 provides a cloud service and includes one or more information processing apparatuses that provide various functions via, for example, Web applications and server applications. The network 10 may include an authentication service unit 12, a print job management service unit 13, an asynchronous conversion service unit 15, an authentication database (DB), a job management database (DB), and a print file storage that are functional units implemented by the information processing apparatuses.

The network 20 is, for example, an internal network of a company and may include at least one terminal 21 and at least one image forming apparatus 22. The terminal 21 may be implemented by any apparatus such as a smartphone, a cell phone, a personal computer (PC), a tablet PC, or a projector that can enter (or output) a print job. The image forming apparatus 22 may be implemented by any apparatus such as a multifunction peripheral or a printer that can execute a print job.

In the printing system 1, after being authenticated by the authentication service unit 12 of the network 10, the terminal 21 sends a print job to the print job management service unit 13 of the network 10 and thereby "enters" the print job. Meanwhile, after being authenticated by the authentication service unit 12 of the network 10, the image forming apparatus 22 receives print data from the print job management service unit 13 of the network 10 and executes the corresponding print job.

The firewall 23 is provided to maintain the security of the network 20. The terminal 21 generates data (e.g., application data) to be printed according to user operations, and sends (or enters) a print job including the generated data to the network 10.

The image forming apparatus 22 displays a print job list that is a list of print jobs receivable from the network 10, and allows the user to select a print job from the print job list. When a print job is selected by the user from the print job list, the image forming apparatus 22 receives print data of the selected print job from the network 10 and prints the print data. The print data is obtained by converting (or rendering) data to be printed (which is hereafter referred to as "print target data") into a format that the image forming apparatus 22 can print.

The reverse proxy 11 functions as a proxy for the print job management service unit 13 and relays a request to the print job management service unit 13. With this configuration, the terminal 21 and the image forming apparatus 22 can access the print job management service unit 13 only via the reverse proxy 11. Accordingly, it is possible to improve the security of the printing system 1 by incorporating a security function in the reverse proxy 11.

The authentication service unit 12 performs authentication of the image forming apparatus 22, users operating the terminal 21 and the image forming apparatus 22, and applications installed in the image forming apparatus 22. The authentication service unit 12 performs authentication using the authentication DB.

When the user operating the terminal 21 is successfully authenticated, the authentication service unit 12 sends an authentication ticket to the terminal 21. When the image forming apparatus 22, the user operating the image forming apparatus 22, and an application installed in the image forming apparatus 22 are all successfully authenticated, the authentication service unit 12 sends an authentication ticket to the image forming apparatus 22.

The print job management service unit 13 manages print jobs sent from (or entered by) the terminal 21 using the job management DB. The asynchronous conversion service unit 15 converts (renders or translates) print target data into print data that the image forming apparatus 22 can print. More specifically, the asynchronous conversion service unit 15 converts print target data into a print file with a format (of, for example, a page description language) that the image forming apparatus 22 can print. The asynchronous conversion service unit 15 converts data into a print file asynchronously with the reception of a conversion request from the print job management service unit 13.

In the printing system 1 configured as described above, the authentication ticket is not sent from the authentication service unit 12 to the image forming apparatus 22 unless the image forming apparatus 22, the user operating the image forming apparatus 22, and an application installed in the image forming apparatus 22 are all successfully authenticated. With this configuration, even if a user ID and a password are stolen by a third party, authentication of an image forming apparatus (which is installed, for example, in a company of the third party or a public environment such as a convenience store) used by the third party fails and the third party cannot obtain and print a print job. Thus, in the printing system 1 of the present embodiment, image forming apparatuses that can perform pull-printing are limited by authentication. This configuration makes it possible to prevent leakage of information to a third party impersonating an authorized user and thereby improve the security of the printing system 1.

<System Configuration>

Figure 2:
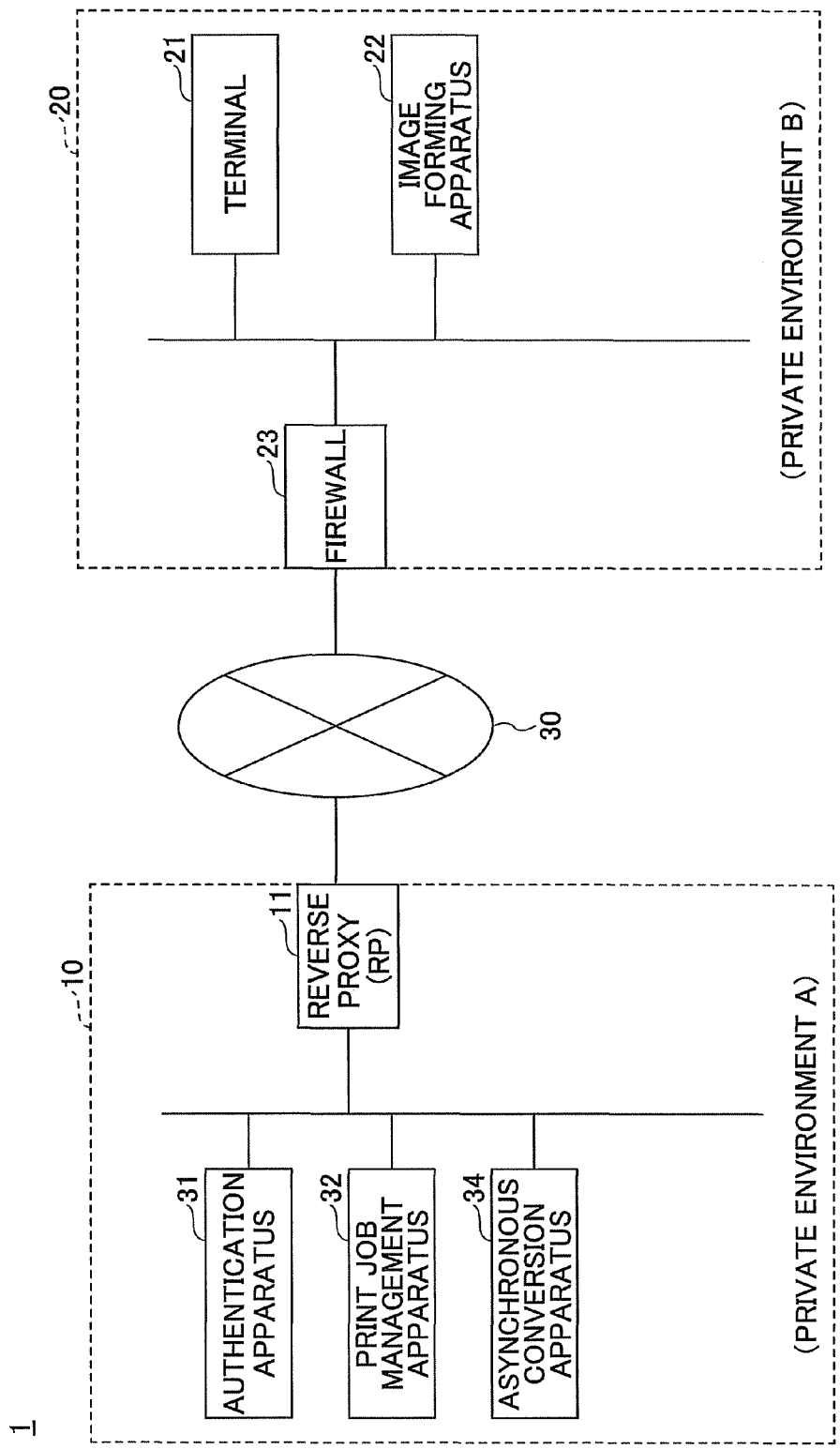
FIG. 2 is another drawing illustrating an exemplary configuration of a printing system according to the first embodiment.

FIG. 2 is another drawing illustrating an exemplary configuration of the printing system 1 according to the first embodiment. In FIG. 2, the network 10 providing a cloud service and the network 20 such as an internal network of a company are connected to each other via a public network 30 such as the Internet.

The network 10 (private environment A) may include the reverse proxy 11, an authentication apparatus 31, a print job management apparatus 32, and an asynchronous conversion apparatus 34. The network 20 (private environment B) may include the terminal 21, the image forming apparatus 22, and the firewall 23.

The authentication apparatus 31 implements the authentication service unit 12 and the authentication DB of FIG. 1. The print job management apparatus 32 implements the print job management service unit 13 and the job management DB of FIG. 1. The asynchronous conversion apparatus 34 implements the asynchronous conversion service unit 15 and the print file storage of FIG. 1.

The authentication apparatus 31, the print job management apparatus 32, and the asynchronous conversion apparatus 34 may be implemented by one computer or two or more computers. Also, the authentication DB, the job management DB, and the print file storage may instead be implemented by database apparatuses and a file storage apparatus that are provided separately from the authentication apparatus 31, the print job management apparatus 32, and the asynchronous conversion apparatus 34.

The terminal 21 generates print target data (e.g., document data, image data, etc.) to be printed using software (or applications). The terminal 21 may also store print target data that is received from another apparatus (not shown). After being authenticated by the authentication apparatus 31, the terminal 21 sends a print job including print target data to the print job management apparatus 32. When receiving the print job, the print job management apparatus 32 sends a conversion request to the asynchronous conversion apparatus 34 to request conversion of the print target data into a format that the image forming apparatus 22 can print.

The asynchronous conversion apparatus 34 converts the print target data into a format that the image forming apparatus 22 can print, asynchronously with the reception of the conversion request from the print job management apparatus 32. For example, the asynchronous conversion apparatus 34 reads the print target data from the print file storage and converts (or renders) the print target data into a print file that the image forming apparatus 22 can print.

The image forming apparatus 22 receives a print job list, which is a list of receivable print jobs, from the print job management apparatus 32 after the image forming apparatus 22, the user operating the image forming apparatus 22, and an application installed in the image forming apparatus 22 are all successfully authenticated. Then, the image forming apparatus 22 displays the print job list on, for example, an operations panel and requests the user to select a print job from the print job list. When a print job is selected, the image forming apparatus 22 requests a print file corresponding to the selected print job from the print job management apparatus 32.

The print job management apparatus 32 obtains the requested print file from the asynchronous conversion apparatus 34 and sends the obtained print file to the image forming apparatus 22. The image forming apparatus 22 receives and prints the print file. Here, the asynchronous conversion apparatus 34 may convert print target data into a print file asynchronously with the request for the print file from the image forming apparatus 22 to the print job management apparatus 32 (i.e., before the print file is requested).

In the printing system 1 configured as described above, the authentication ticket is not sent from the authentication apparatus 31 to the image forming apparatus 22 unless the image forming apparatus 22, the user operating the image forming apparatus 22, and an application installed in the image forming apparatus 22 are all successfully authenticated. With this configuration, it is possible to prevent leakage of information to a third party impersonating an authorized user using a stolen user ID and password and thereby maintain the security of the printing system 1.

<Hardware Configuration>

Figure 3:
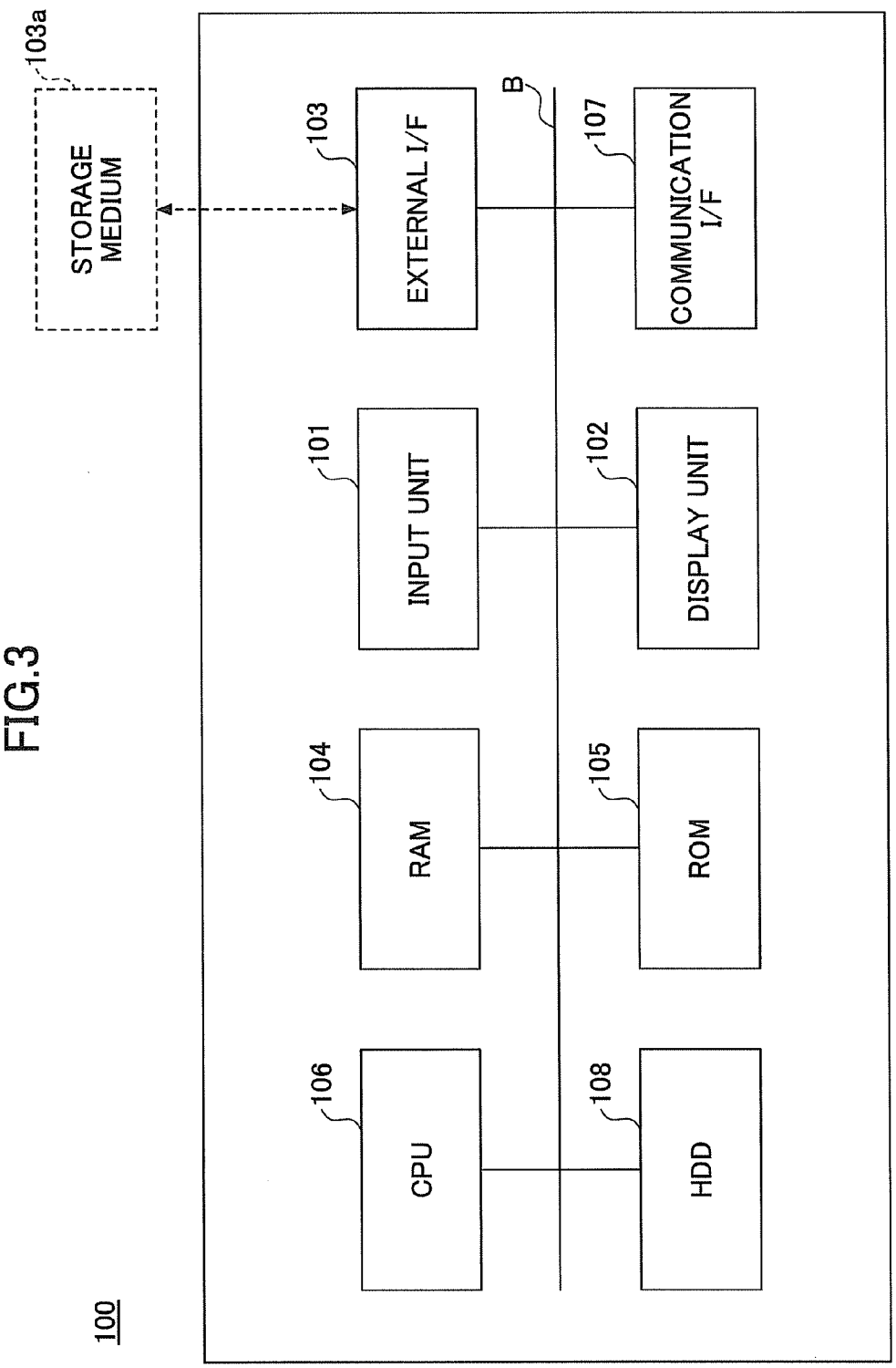
FIG. 3 is a block diagram illustrating an exemplary hardware configuration of an information processing apparatus according to an embodiment.

Each of the authentication apparatus 31, the print job management apparatus 32, and the asynchronous conversion apparatus 34 may be implemented by an information processing apparatus 100 having a hardware configuration as illustrated in FIG. 3. FIG. 3 is a block diagram illustrating an exemplary hardware configuration of the information processing apparatus 100.

As illustrated in FIG. 3, the information processing apparatus 100 may include an input unit 101, a display unit 102, an external I/F 103, a random access memory (RAM) 104, a read-only memory (ROM) 105, a central processing unit (CPU) 106, a communication I/F 107, and a hard disk drive (HDD) 108 that are connected to each other via a bus B.

The input unit 101 includes, for example, a keyboard and a mouse, and is used to input instructions (or operation signals) to the information processing apparatus 100. The display unit 102 displays, for example, processing results of the information processing apparatus 100.

The communication I/F 107 is an interface for connecting the information processing apparatus 100 to a network. The information processing apparatus 100 can perform data communications with other apparatuses via the communication I/F 107.

The HDD 108 is a non-volatile storage device for storing various programs and data. For example, the HDD 108 stores basic software or an operating system (OS) for controlling the entire information processing apparatus 100, and application software for providing various functions on the OS. The HDD 108 may manage the stored programs and data using a file system and/or a database (DB).

The external I/F 103 is an interface between the information processing apparatus 100 and an external device such as a storage medium 103a. The information processing apparatus 100 can read and write data from and to the storage medium 103a via the external I/F 103. The storage medium 103a may be implemented by, for example, a flexible disk, a compact disk (CD), a digital versatile disk (DVD), a secure digital (SD) memory card, or a universal serial bus (USB) memory.

The ROM 105 is a non-volatile semiconductor memory (storage unit) that can retain programs and data even when power is turned off. For example, the ROM 105 stores programs and data such as a basic input/output system (BIOS) that is executed when the information processing apparatus 100 is turned on, and system and network settings of the information processing apparatus 100. The RAM 104 is a volatile semiconductor memory (storage unit) for temporarily storing programs and data.

The CPU (processor) 106 loads programs and data from storage units (e.g., the HDD 108 and the ROM 105) into the RAM 104 and executes the loaded programs to control the information processing apparatus 100 and to implement various functional units of the information processing apparatus 100.

With the hardware configuration described above, the authentication apparatus 31, the print job management apparatus 32, and the asynchronous conversion apparatus 34 can perform processes as described later. Although the hardware configurations of the reverse proxy 11, the terminal 21, the image forming apparatus 22, and the firewall 23 are omitted here, these apparatuses may also have a hardware configuration similar to that illustrated in FIG. 3.

<Processes Performed by Printing System>

Exemplary processes performed by the printing system 1 are described below.

<Information Registration Process>

For example, an administrator having administrative rights of the network 20 accesses a uniform resource locator (URL) of the authentication apparatus 31 by using, for example, a browser of the terminal 21 and registers tables as illustrated in FIGS. 4A through 4C in the authentication DB.

FIGS. 4A through 4C are exemplary tables registered in the authentication DB. FIG. 4A is a table storing company IDs, company names, user IDs, user names, and passwords that are associated with each other. FIG. 4B is a table storing company IDs and device IDs that are associated with each other. FIG. 4C is a table storing a basic authentication code.

The company IDs are identification information for uniquely identifying companies or other types of organizations. The company names are names of companies. The user IDs are identification information for uniquely identifying users. The user names are names of users. The passwords are secret identification information. The device IDs are identification information (e.g., serial numbers) for uniquely identifying image forming apparatuses 22. The basic authentication code is used for basic authentication. For example, the basic authentication code may be identification information for uniquely identifying an application installed in the image forming apparatus 22.

With the table of FIG. 4A registered in the authentication DB, the user of the terminal 21 and the image forming apparatus 22 can be authenticated by entering a company name, a user name, and a password. With the table of FIG. 4B registered in the authentication DB, the image forming apparatus 22 can be authenticated. With the table of FIG. 4C registered in the authentication DB, an application of the image forming apparatus 22 can be authenticated.

In the printing system 1 of the present embodiment, as illustrated in FIG. 4A, companies and users belonging to the companies are associated with each other. Also, as illustrated in FIG. 4B, companies and devices such as the image forming apparatuses 22 installed in the companies are associated with each other.

A URL for accessing the authentication apparatus 31 from the image forming apparatus 22 is different from a URL for accessing the authentication apparatus 31 from the terminal 21 located in the same company as the image forming apparatus 22. The image forming apparatus 22 establishes a secure socket layer (SSL) connection with the reverse proxy 11. Then, the reverse proxy 11 requests the image forming apparatus 22 to submit a client certificate. The client certificate may be set in the image forming apparatus 22 before the factory shipment or obtained by the image forming apparatus 22 after the factory shipment.

By submitting the client certificate, the image forming apparatus 22 is authenticated (or certified) as a device that is located in the same company as the terminal 21. Meanwhile, the user of the terminal 21 and the image forming apparatus 22 is authenticated by the authentication apparatus 31 by sending a user ID and a password to the authentication apparatus 31 or by using a pre-registered card ID.

Thus, the image forming apparatus 22 is certified as a device located in the same company as the terminal 21 by establishing an SSL connection and submitting a client certificate obtained in advance. In the SSL connection, if the client certificate has been issued from an authentication apparatus that is not trusted by the network 10, the image forming apparatus 22 cannot access the network 10. In the printing system 1, it is determined whether the image forming apparatus 22 has a client certificate issued by the authentication apparatus 31 trusted by the network 10.

Before using the cloud service of the network 10, an organization such as a company or a university needs to subscribe to the cloud service so that an administrator account (e.g., a company ID, a user ID, and a password) for the organization is registered at the network 10. Also, it is necessary to install, in the image forming apparatus 22, a dedicated application for connecting to an application providing the cloud service and make connection settings (e.g., proxy information setting) for connection to the application. By making the connection settings, a device ID is registered in association with the organization, and a user ID and a password (user account) are also registered in association with the organization in a database provided at the network 10 providing the cloud service. The company ID is an example of an organization ID.

(Print Job Registration Process)

Figure 5:
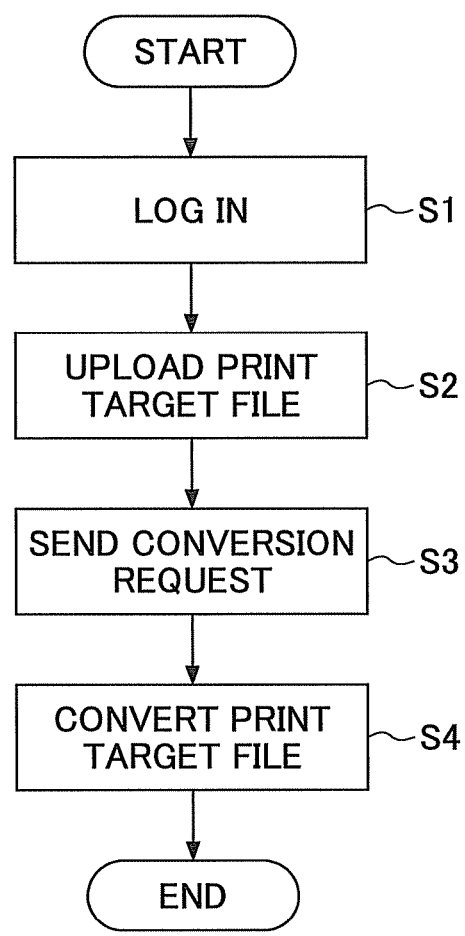
FIG. 5 is a flowchart illustrating an exemplary print job registration process.

FIG. 5 is a flowchart illustrating an exemplary print job registration process. Here, it is assumed that the printing system 1 is configured as illustrated in FIG. 1. In step S1, the user performs a login operation by entering a company ID, a user ID, and a password using, for example, a browser of the terminal 21. The authentication service unit 12 of the network 10 performs authentication of the user by referring to the authentication DB as illustrated in FIGS. 4A through 4C. When the combination of the company ID, the user ID, and the password entered via the terminal 21 is registered in the authentication DB, the authentication service unit 12 determines that the user is an authorized user and the login is successful.

When the login is successful, the terminal 21 is redirected to a screen of the print job management service unit 13 of the network 10. In other words, the terminal 21 is directed to a different URL.

In step S2, the user uploads a print target file (or print target data) to be printed, from the terminal 21 to the print job management service unit 13. In this step, the user (or the terminal 21) may also upload printing conditions together with the print target file to the print job management service unit 13. The printing conditions may include, for example, duplex or single-side printing and the number of copies. The user may upload plural print target files from the terminal 21 to the print job management service unit 13.

In step S3, the print job management service 13 sends a conversion request including the file name of the uploaded print target file and the printing conditions to the asynchronous conversion service unit 15.

Also, the print job management service unit 13 associates the uploaded print target file, the company ID, and the user ID using the job management DB with each other to manage print jobs.

In step S4, the asynchronous conversion service unit 15 converts the print target file indicated by the conversion request based on the printing conditions in the conversion request into a print file that the image forming apparatus 22 can print. Step S4 is performed asynchronously with the reception of the conversion request. The asynchronous conversion service unit 15 stores the print file obtained by converting the print target file in, for example, the print file storage.

<Printing Process>

Figure 6:
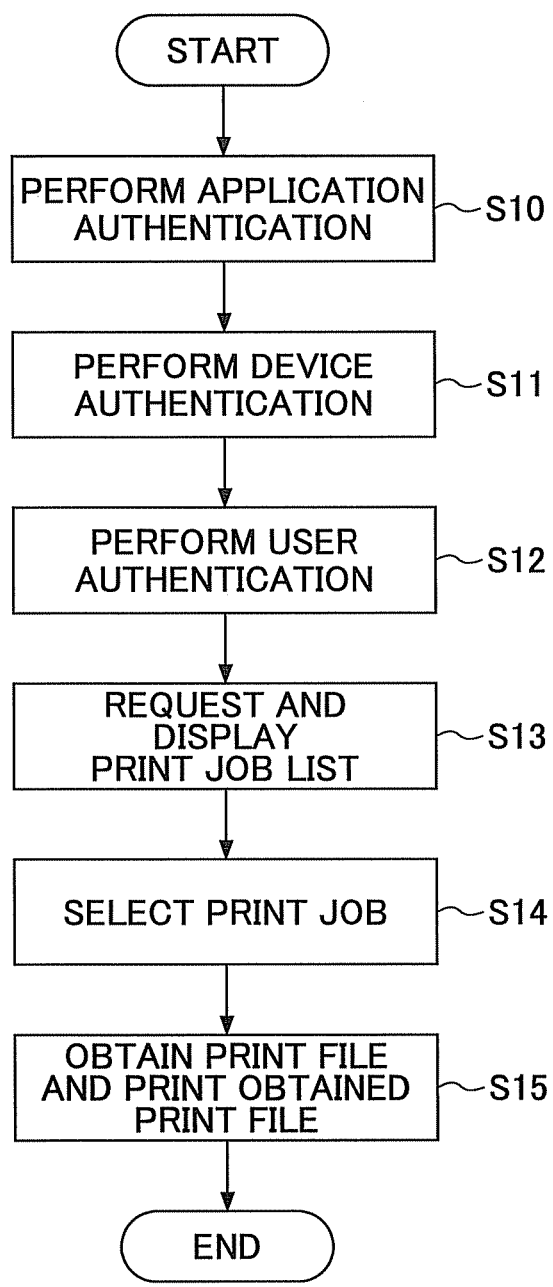
FIG. 6 is a flowchart illustrating an exemplary printing process.

FIG. 6 is a flowchart illustrating an exemplary printing process. The user enters a user ID and a password by operating, for example, an operations panel of the image forming apparatus 22. The image forming apparatus 22 establishes an SSL connection with the reverse proxy 11 using a client certificate associated in advance with the image forming apparatus 22. The image forming apparatus 22 sends a device ID (e.g., a serial number) unique to the image forming apparatus 22, an application ID for uniquely identifying an application installed in the image forming apparatus 22, the user ID, the password, and a company ID set in the image forming apparatus 22 to the authentication service unit 12.

In step S10, the authentication service unit 12 performs authentication of the application installed in the image forming apparatus 22. When the application ID sent from the image forming apparatus 22 is registered in the authentication DB as the basic authentication code (see FIG. 4C), the authentication service unit 12 determines that the application is valid and the authentication is successful.

In step S11, the authentication service unit 12 performs authentication of the image forming apparatus 22. When the image forming apparatus 22 has a valid client certificate and the combination of the device ID and the company ID sent from the image forming apparatus 22 is registered in the table of FIG. 4B (or the authentication DB), the authentication service unit 12 determines that the image forming apparatus 22 is valid and the authentication is successful.

Thus, the image forming apparatus 22 is recognized as a valid device based on the client certificate. Also, since the image forming apparatus 22 is associated with a company ID as illustrated in FIG. 4B, it is determined in step S11 that the image forming apparatus 22 belongs to a company indicated by the company ID.

In step S12, the authentication service unit 12 performs authentication of the user of the image forming apparatus 22. The authentication service unit 12 performs authentication of the user by referring to the table of FIG. 4A based on the user ID, the password, and the company ID sent from the image forming apparatus 22. When the combination of the user ID, the password, and the company ID sent from the image forming apparatus 22 is registered in the table of FIG. 4A (or the authentication DB), the authentication service unit 12 determines that the user is an authorized user and the authentication is successful. When the authentication is successful, the image forming apparatus 22 receives an authentication ticket from the authentication service unit 12.

In step S13, the image forming apparatus 22 requests a print job list from the print job management service unit 13 by using the authentication ticket. The validity of the authentication ticket is confirmed, for example, by a policy agent (Web agent) provided in the reverse proxy 11. A company ID and a user ID associated with the authentication ticket may be sent to the print job management service unit 13 together with the request for the print job list. Here, the policy agent is a component that obtains policy information and sends the obtained policy information to another component that needs the policy information to provide a security service.

The print job management service unit 13 requests the asynchronous conversion service unit 15 to send a conversion completion list, which indicates format conversion status, i.e., whether print target files have been converted into print files, based on a print job list of print jobs that are associated with the print target files, the company ID, and the user ID. When receiving the conversion completion list, the print job management service unit 13 sends the print job list including the format conversion status to the image forming apparatus 22. Then, the image forming apparatus 22 displays the print job list on the operations panel.

In step S14, the user selects one or more print files (or print jobs) from the displayed print job list and requests printing of the selected print files. The image forming apparatus 22 may be configured to display the print job list such that print files of printable (or receivable) print jobs are displayed as selectable items and print files of non-printable (or non-receivable) print jobs are displayed as non-selectable items. Also, the image forming apparatus 22 may be configured to display the print job list such that all print files of printable print jobs are selected by default to reduce user operations.

In step S15, the image forming apparatus 22 requests the selected print files from the print job management service unit 13. The print job management service unit 13 obtains the requested print files from the asynchronous conversion service unit 12 and sends the obtained print files to the image forming apparatus 22. The image forming apparatus 22 receives and prints the print files.

In the printing process of FIG. 6, the authentication ticket is not sent from the authentication service unit 12 to the image forming apparatus 22 unless the image forming apparatus 22, the user of the image forming apparatus 22, and the application of the image forming apparatus 22 are all successfully authenticated. With this configuration, it is possible to prevent leakage of information to a third party impersonating an authorized user using a stolen user ID and password and thereby maintain the security of the printing system 1.

In the example of FIG. 6, application authentication of step S10, device authentication of step S11, and user authentication of step S12 are performed in this order. However, the order of these authentication steps may be changed. Also, the application authentication of step S10 may be omitted.

<Print Job Registration Process and Printing Process>

FIGS. 7A and 7B are parts of a sequence chart illustrating details of a print job registration process and a printing process. Here, it is assumed that the printing system 1 is configured as illustrated in FIG. 1. In step S301, the terminal 21 establishes an SSL connection with the reverse proxy 11.

In step S302, the terminal 21 tries to access the print job management service unit 13 via the reverse proxy 11. However, since the terminal 21 has no authentication ticket, the reverse proxy 11 redirects the terminal 21 to a login screen of the authentication service unit 12 in steps S303 and S304.

In step S305, the terminal 21 receives the login screen. The user performs a login operation on the login screen. In step S306, the terminal 21 sends a company ID, a user ID, and a password to the authentication service unit 12. The authentication service unit 12 performs authentication of the user by referring to the table of FIG. 4A in the authentication DB.

When the combination of the company ID, the user ID, and the password entered via the terminal 21 is registered in the table of FIG. 4A (authentication DB), the authentication service unit 12 determines that the user is an authorized user and the login is successful. When the login is successful, the authentication service unit 12 sends an authentication token (cookie), which is an example of an authentication ticket, to the terminal 21 in step S307.

In step S308, since the terminal 21 has the authentication token, the terminal 21 is redirected to a print job registration screen of the print job management service unit 13. In step S309, the print job management service unit 13 sends the print job registration screen to the terminal 21. The terminal 21 receives and displays the print job registration screen. The user specifies a print target file (e.g., a document) on the print job registration screen. The user can also specify printing conditions on the print job registration screen.

In step S310, the terminal 21 sends the print target file and the printing conditions to the print job management service 13. In step S311, the print job management service unit 12 sends a conversion request to the asynchronous conversion service 15 to request conversion of the print target file into a format that the image forming apparatus 22 can print. In step S312, the asynchronous conversion service 15 returns a request reception report to the print job management service unit 13. In step S313, the print job management service unit 13 sends, to the terminal 21, a print job registration report indicating that a print job has been successfully registered.

When receiving the conversion request, the asynchronous conversion service unit 15 converts the print target file indicated by the conversion request into a print file with a format that the image forming apparatus 22 can print. The asynchronous conversion service 15 converts the print target file asynchronously with the reception of the conversion request at step S311. For example, the asynchronous conversion service unit 15 stores the print file obtained by converting the print target file in the print file storage.

After registering the print job, the user operating the terminal 21 moves to a location where the image forming apparatus 22 is installed. The user starts an application of the image forming apparatus 22 and enters a user ID and a password.

In step S314, the image forming apparatus 22 establishes an SSL connection with the reverse proxy 11 using a client certificate. In step S315, the image forming apparatus 22 sends a company ID, a user ID, a password, a device ID, and an application ID to the authentication service unit 12. The authentication service unit 12 confirms the validity of the application (application authentication), the validity of the company, and the validity (location or presence) of the image forming apparatus 22 (device authentication).

When the validity of the application and the image forming apparatus 22 is successfully confirmed (i.e., when the application authentication and the device authentication are successful), the authentication service unit 12 performs user authentication. The authentication service unit 12 performs user authentication by referring to the table of FIG. 4A (authentication DB) based on the user ID, the password, and the company ID sent from the image forming apparatus 22.

When the authentication is successful, in step S316, the authentication service unit 12 sends an authentication token to the image forming apparatus 22. In step S317, the image forming apparatus 22 requests a print job list from the print job management service 13 using the authentication token, and also sends the device ID to the print job management service unit 13.

The validity of the authentication token is confirmed, for example, by a policy agent provided in the reverse proxy 11. When the validity of the authentication token is confirmed, the reverse proxy 11 sends the company ID and the user ID associated with the authentication token to the print job management service 13 together with the request for the print job list.

In step S318, the print job management service unit 13 requests the asynchronous conversion service unit 15 to send a conversion completion list indicating format conversion status, i.e., whether print target files have been converted into print files. In step S319, the asynchronous conversion service unit 15 sends the conversion completion list to the print job management service 13.

In step S320, the print job management service unit 13 sends the print job list including the format conversion status to the image forming apparatus 22. The image forming apparatus 22 displays the print job list on the operations panel. Then, the user selects one or more print files (i.e., documents the user needs to print) from the displayed print job list and requests printing of the selected print files (e.g., by pressing a print button).

In step S321, the image forming apparatus 22 requests the selected print files (or documents to be printed) from the print job management service unit 13, and also sends the device ID to the print job management service unit 13.

In step S322, the print job management service unit 13 requests the asynchronous conversion service unit 15 to send the print files requested by the image forming apparatus 22. In step S323, the asynchronous conversion service unit 15 sends the requested print files (or documents to be printed) to the print job management service unit 13. In step S324, the print job management service unit 13 sends the requested print files (or documents to be printed) to the image forming apparatus 22. The, the image forming apparatus 22 receives and prints the print files.

<Details of Steps S301 Through S309>

Figure 8:
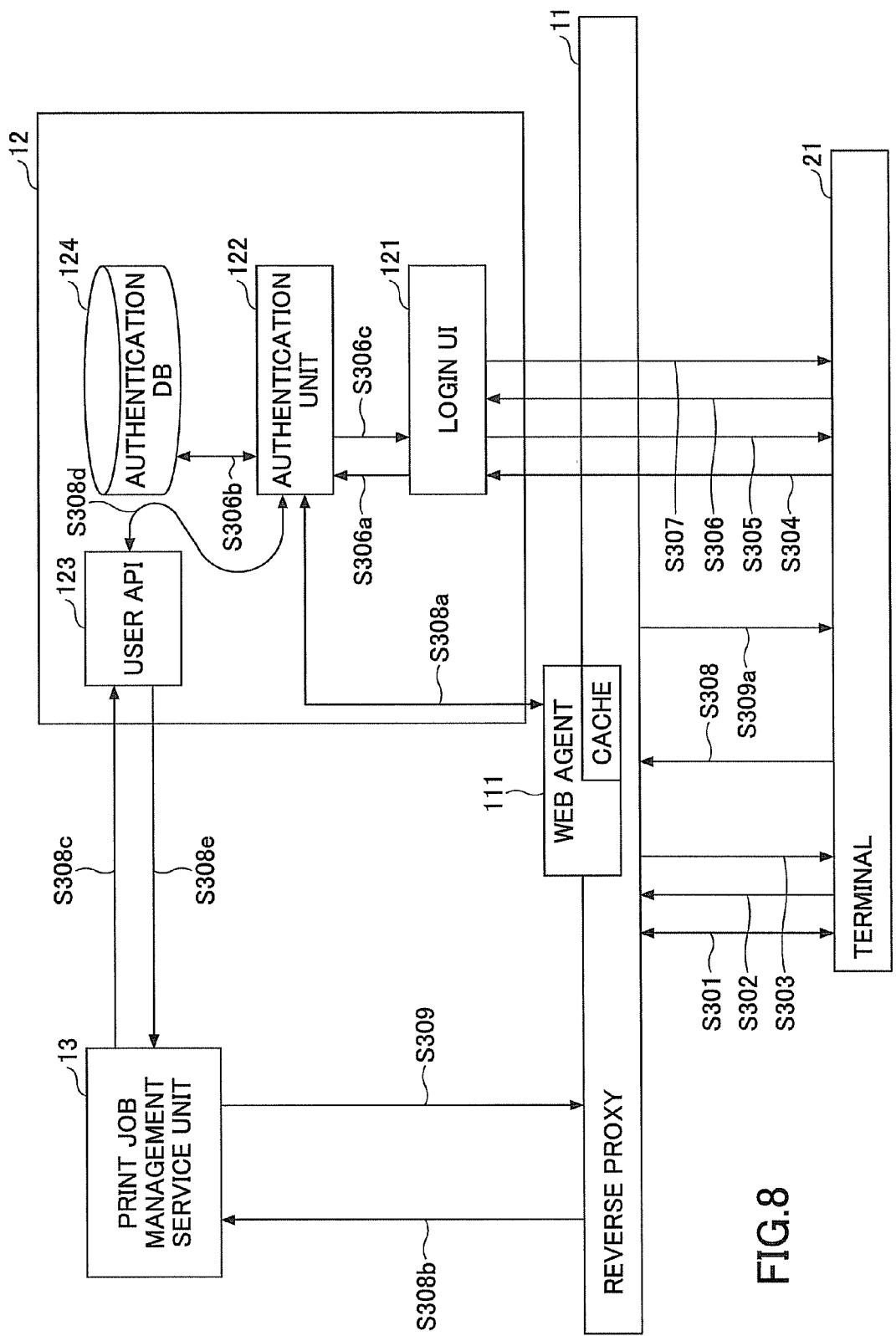
FIG. 8 is a drawing used to describe steps S301 through S309 of FIG. 7A.

FIG. 8 is a drawing used to describe steps S301 through S309 of FIG. 7A in more detail. As illustrated in FIG. 8, the authentication service unit 12 may include a login UI 121, an authentication unit 122, a user API 123, and an authentication DB 124. The login UI 121 is a user interface for logging in.

The authentication unit 122 performs authentication using the authentication DB 124. The authentication unit 122 may be implemented, for example, by OpenAM. OpenAM is authentication platform software that provides a single sign-on (SSO) architecture. The authentication unit 122 performs authentication based on company IDs, user IDs, and passwords stored in the authentication DB 124, which is an example of a user data store, and also performs authentication based on client certificates.

The user API 123 is an application programming interface that receives requests to confirm the validity of authentication tokens from Web applications such as the print job management service unit 13 and other applications, and returns confirmation results to those applications.

In step S301, the terminal 21 establishes an SSL connection with the reverse proxy 11. In step S302, the terminal 21 tries to access the print job management service unit 13 via the reverse proxy 11. The reverse proxy 11 confirms whether a request (which may be referred to as an "access request") from the terminal 21 to access the print job management service 13 includes an authentication token.

When the access request to the print job management service 13 includes no authentication token, the reverse proxy 11 redirects the terminal 21 to the login UI 121 of the authentication service unit 12 in steps S303 and S304.

In step S305, the login UI 121 sends a login screen to the terminal 21, and the terminal 21 receives the login screen. The user performs a login operation on the login screen. In step S306, the terminal 21 sends a company ID, a user ID, and a password to the login UI 121 of the authentication service unit 12.

In step S306a, the login UI 121 requests the authentication unit 122 to authenticate the user based on the company ID, the user ID, and the password received from the terminal 21. In step S306b, the authentication unit 122 performs authentication by referring to the authentication DB 124. For example, when the combination of the company ID, the user ID, and the password sent from the terminal 21 is registered in the table of FIG. 4A (in the authentication DB 124), the authentication unit 122 determines that the user is an authorized user.

When the user is successfully authenticated, the authentication unit 122 sends an authentication token to the login UI 121 in step S306c. In step S307, the login UI 121 sends the authentication token received from the authentication unit 122 to the terminal 21.

In step S308, the terminal 21 tries to access the print job management service unit 13 via the reverse proxy 11. The reverse proxy 11 confirms whether the access request from the terminal 21 to access the print job management service 13 includes an authentication token.

In this case, since the access request includes the authentication token, the reverse proxy 11 queries a Web agent 111 whether the authentication token is in a cache. When the authentication token is not in the cache, the Web agent 111, in step S308a, requests and receives contents of the authentication token from the authentication unit 122.

Then, the Web agent 111 stores the received contents of the authentication token in the cache. The contents of the authentication token cached by the Web agent 111 may include, for example, a company ID, a user ID, and an accessible destination. After the validity of the authentication token is confirmed, the reverse proxy 11, in step S308b, redirects the terminal 21 to a print job registration screen of the print job management service unit 13. In this step, the reverse proxy 11 also sends the company ID and the user ID associated with the authentication token to the print job management service unit 13.

In step S308c, the print job management service unit 13 requests the user API 123 of the authentication service unit 12 to confirm the validity of the received authentication token. In step S308d, the user API 123 requests the authentication unit 122 to confirm the validity of the authentication token and receives the confirmation result.

In step S308e, the print job management service unit 13 receives the confirmation result of the validity of the authentication token from the user API 123. When the validity of the authentication token is confirmed, the print job management service unit 13, in steps S309 and S309a, sends the print job registration screen to the terminal 21. The terminal 21 receives and displays the print job registration screen.

<Details of Steps S314 Through S317>

Figure 9:
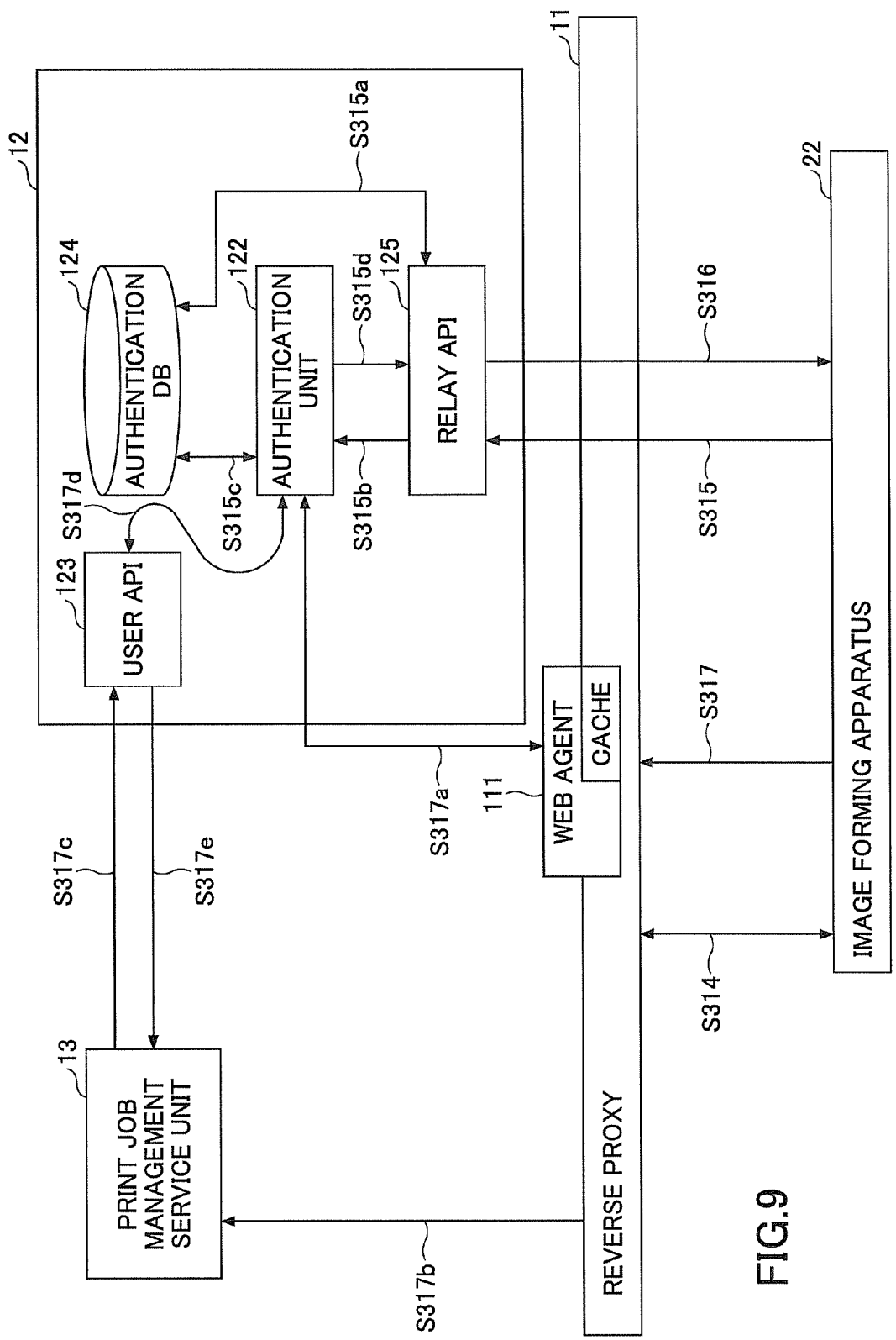
FIG. 9 is a drawing used to describe steps S314 through S317 of FIG. 7B.

FIG. 9 is a drawing used to describe steps S314 through S317 of FIG. 7B in more detail. As illustrated in FIG. 9, the authentication service unit 12 may include a relay API 125 in addition to the components of the authentication service unit 12 illustrated in FIG. 8. The relay API 125 is an authentication application programming interface (API) for devices such as the image forming apparatus 22. The relay API 125 receives an authentication request from the image forming apparatus and returns an authentication result to the image forming apparatus 22.

In step S314, the image forming apparatus 22 establishes an SSL connection with the reverse proxy 11 using a client certificate. In step S315, the image forming apparatus 22 sends an authentication request including a company ID, a user ID, a password, a device ID, and an application ID to the relay API 125 of the authentication service unit 12.

In step S315a, when the application ID sent from the image forming apparatus 22 is registered in the authentication DB 124 as the basic authentication code (see FIG. 4C), the relay API 125 determines that the application is valid and the application authentication is successful.

When the combination of the device ID and the company ID sent from the image forming apparatus 22 is registered in the table of FIG. 4A (in the authentication DB 124), the relay API 125 determines that the image forming apparatus 22 is valid and the device authentication is successful.

In step S315b, the relay API 125 requests the authentication unit 122 to authenticate the user based on the user ID, the password, and the company ID sent from the image forming apparatus 22. In step S315c, when the combination of the user ID, the password, and the company ID sent from the image forming apparatus 22 is registered in the table of FIG. 4A (in the authentication DB 124), the authentication unit 122 determines that the user is an authorized user and the user authentication is successful.

When the user is successfully authenticated, the authentication unit 122 sends an authentication token to the relay API 125 in step S315d. In step S316, the relay API 125 sends the authentication token received from the authentication unit 122 to the image forming apparatus 22.

In step S317, the image forming apparatus 22 tries to access the print job management service unit 13 via the reverse proxy 11 to request a print job list. The reverse proxy 11 confirms whether the access request to the print job management service 13 includes an authentication token.

In this case, since the access request includes the authentication token, the reverse proxy 11 queries the Web agent 111 whether the authentication token is in a cache. When the authentication token is not in the cache, the Web agent 111, in step S317a, requests and receives contents of the authentication token from the authentication unit 122.

Then, the Web agent 111 stores the received contents of the authentication token in the cache. The contents of the authentication token cached by the Web agent 111 may include, for example, a company ID, a user ID, and an accessible destination. After the validity of the authentication token is confirmed, the reverse proxy 11, in step S317b, requests a print job list from the print job management service unit 13 and also sends the device ID to the print job management service unit 13. Also in this step, the reverse proxy 11 sends the company ID and the user ID associated with the authentication token to the print job management service unit 13.

In step S317c, the print job management service unit 13 requests the user API 123 of the authentication service unit 12 to confirm the validity of the received authentication token. In step S317d, the user API 123 requests the authentication unit 122 to confirm the validity of the authentication token and receives the confirmation result.

In step S317e, the print job management service unit 13 receives the confirmation result of the validity of the authentication token from the user API 123. When the validity of the authentication token is confirmed, the print job management service unit 13 can proceed to step S318.

<Summary>

As described above, in the printing system 1 of the first embodiment, devices used for printing (e.g., the image forming apparatuses 22) are registered in association with companies, and only documents registered as print jobs of the companies are printed from the registered devices. In other words, a print file registered as a print job of a company cannot be output from a device (e.g., the image forming apparatus 22) of another company.

Here, when authentication is performed using a card, it is necessary to register a card ID and user information in association with each other. However, if user authentication is performed at the network 10 (which provides a cloud service) using a card ID, print jobs may be stolen by a malicious third party who impersonates an authorized user using a stolen card ID.

With the configuration of the first embodiment, device authentication is performed before user authentication so that the user authentication is performed only when it is requested from a valid device. Accordingly, this configuration makes it possible to prevent leakage of print jobs to a third party impersonating an authorized user.

Also with the printing system 1 of the first embodiment, a user can obtain a print file and print the print file on an image forming apparatus 22 only when the user, the image forming apparatus 22, and an application installed in the image forming apparatus 22 are all successfully authenticated. In other words, in the printing system 1 of the first embodiment, a print file of a user can be printed only on an image forming apparatus 22 that is associated with the company ID of a company to which the user belongs. Accordingly, this configuration makes it possible to prevent leakage of information to a third party impersonating an authorized user using a stolen user ID and password and thereby makes it possible to improve security.

<<Second Embodiment>>

With the configuration of the first embodiment, user IDs and passwords are sent via the public network 30 such as the Internet. In a second embodiment, a printing system is configured such that user IDs and passwords are not sent via the public network 30 such as the Internet.

<Collaboration Between Authentication Systems>

In the second embodiment, an authentication system of the network 10 providing a cloud service using a Security Assertion Markup Language (SAML) collaborates with an authentication system of the network 20 (e.g., an internal network of a company) to provide a single sign-on architecture.

Figure 10:
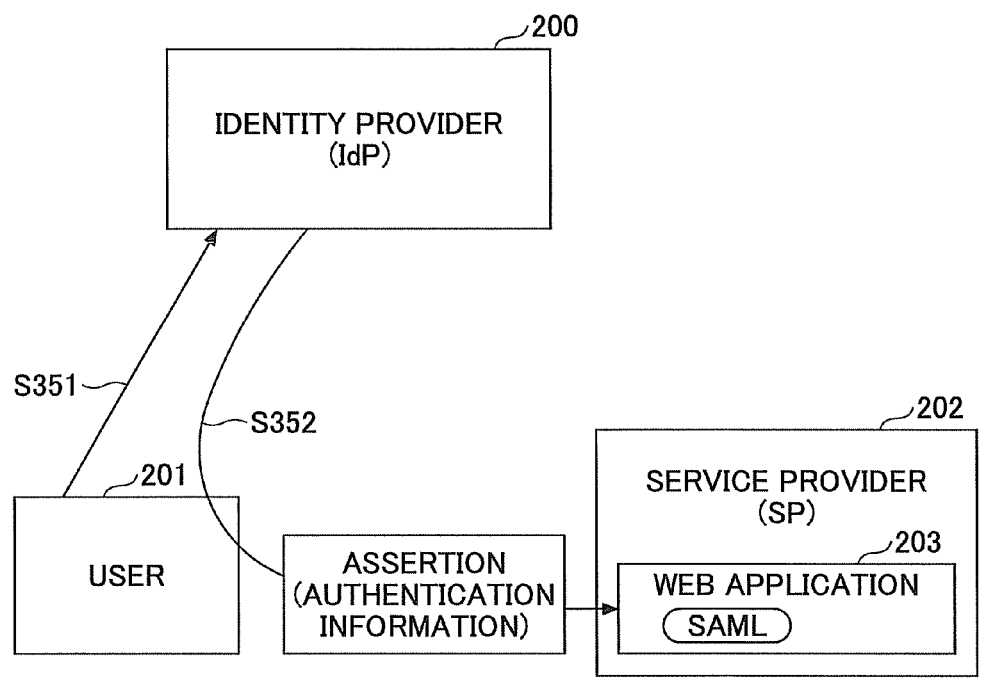
FIG. 10 is a drawing used to describe a single sign-on architecture.

FIG. 10 is a drawing used to describe a single sign-on architecture. In FIG. 10, an identity provider (IdP) 200 is, for example, an authentication server or an authentication apparatus that provides authentication information. A user 201 authenticated by the IdP 200 can access a service provided by a service provider (SP) 202. The SP 202 includes a Web application 203 that is a target of single sign-on. The SP 202 provides a service to the user 201 based on authentication information (assertion) issued by the IdP 200. The SP 202 authorizes the user 201 to use a service based on the authentication information. Alternatively, the user 201 may be authorized by an agent of OpenAM.

In step S351, the user 201 logs into the IdP 200, which provides an authentication platform and manages IDs, via a terminal such as a PC. In step S352, the IdP 200 authenticates the user 201 and issues authentication information called "assertion". The user 201 sends the authentication information issued by the IdP 200 to the SP 202.

The Web application 203 of the SP 202 supports SAML. SAML is a framework for exchanging authentication information via the Extensible Markup Language (XML). The SP 202 receives the authentication information and provides a service to the user 201.

Thus, with the above described architecture, the user 201 can access the Web application 203 of the SP 202 without performing an additional login operation. This indicates that a relationship of trust is built beforehand between the IdP 200 and the SP 202. The IdP 200 and the SP 202 share the account information of the user 201 and use the same authentication information to enable single sign-on.

Assuming that the IdP 200 is an authentication apparatus in the network 20 and the SP 202 is the print job management apparatus 32 of the network 10, the user 201 can log into the print job management apparatus 32 of the network 10 by just logging into the authentication apparatus of the network 20 using a user ID and a password.

In the second embodiment, device authentication is performed to guarantee that a requesting device is associated with an appropriate company ID and transmission of user IDs and passwords is kept within the network 20 (i.e., an internal network) to improve security. Also in the second embodiment, a single sign-on architecture is employed to improve the convenience of the user 201.

<Configuration of Printing System>

Figure 11:
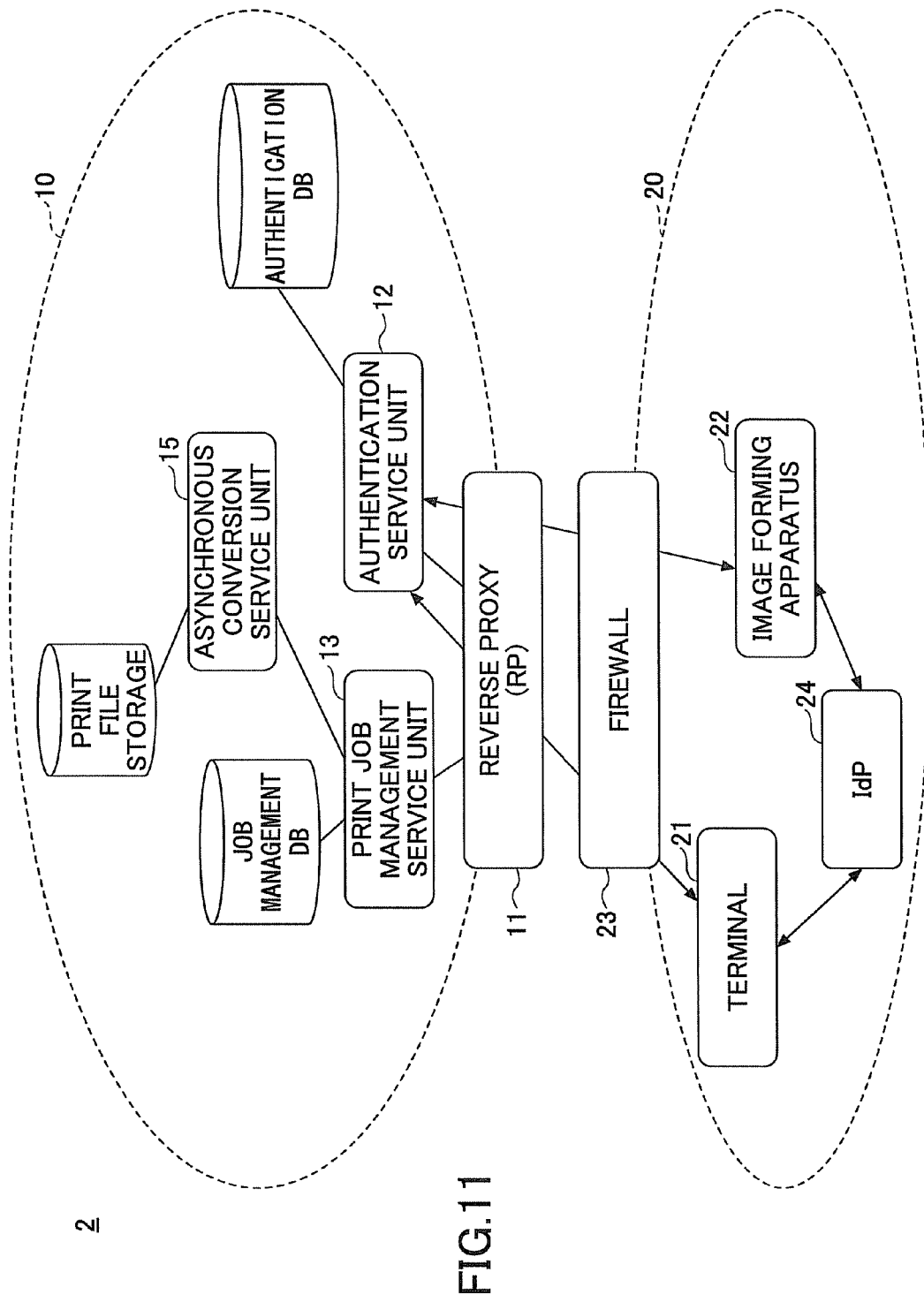
FIG. 11 is a drawing illustrating an exemplary configuration of a printing system according to a second embodiment.

FIG. 11 is a drawing illustrating an exemplary configuration of a printing system 2 according to the second embodiment. The printing system 2 of FIG. 11 has a configuration similar to the configuration of the printing system 1 of FIG. 1 except that an IdP 24 is added to the network 20. Below, descriptions of components and operations of the printing system 2 that overlap those in the first embodiment may be omitted.

The network 20 is, for example, an internal network of a company and may include at least one terminal 21, at least one image forming apparatus 22, and the IdP 24. The IdP 24 may be implemented by one or more information processing apparatuses.

In the printing system 2 of the second embodiment, the IdP 24 of the network 20 authenticates the terminal 21 and issues an authentication ticket (which may be referred to as "assertion") for the terminal 21. The terminal 21 sends a print job to the print job management service unit 13 of the network 10, i.e., enters the print job, by using the authentication ticket. The IdP 24 of the network 20 also authenticates the image forming apparatus 22 and issues an authentication ticket ("assertion") for the image forming apparatus 22. The image forming apparatus 22 receives a print job (or print data) from the print job management service unit 13 of the network 10 by using the authentication ticket, and executes the print job.

The authentication service unit 12 performs user authentication by using the authentication tickets sent from the terminal 21 and the image forming apparatus 22. The authentication service unit 12 also performs authentication of the image forming apparatus 22 and an application installed in the image forming apparatus 22 by using the authentication DB. When the user operating the terminal 21 is successfully authenticated, the authentication service unit 12 sends an authentication ticket to the terminal 21. When the image forming apparatus 22, the user operating the image forming apparatus 22, and an application installed in the image forming apparatus 22 are all successfully authenticated, the authentication service unit 12 sends an authentication ticket to the image forming apparatus 22.

Thus, in the printing system 2 of the second embodiment, the IdP 24 provided in the network 20 authenticates a user based on a user ID and a password, and issues an authentication ticket when the user is successfully authenticated. Also in the printing system 2, instead of user IDs and passwords, authentication tickets are sent and received between the network 10 and the network 20. In other words, transmission of user IDs and passwords is kept within the network 20.

<System Configuration>

Figure 12:
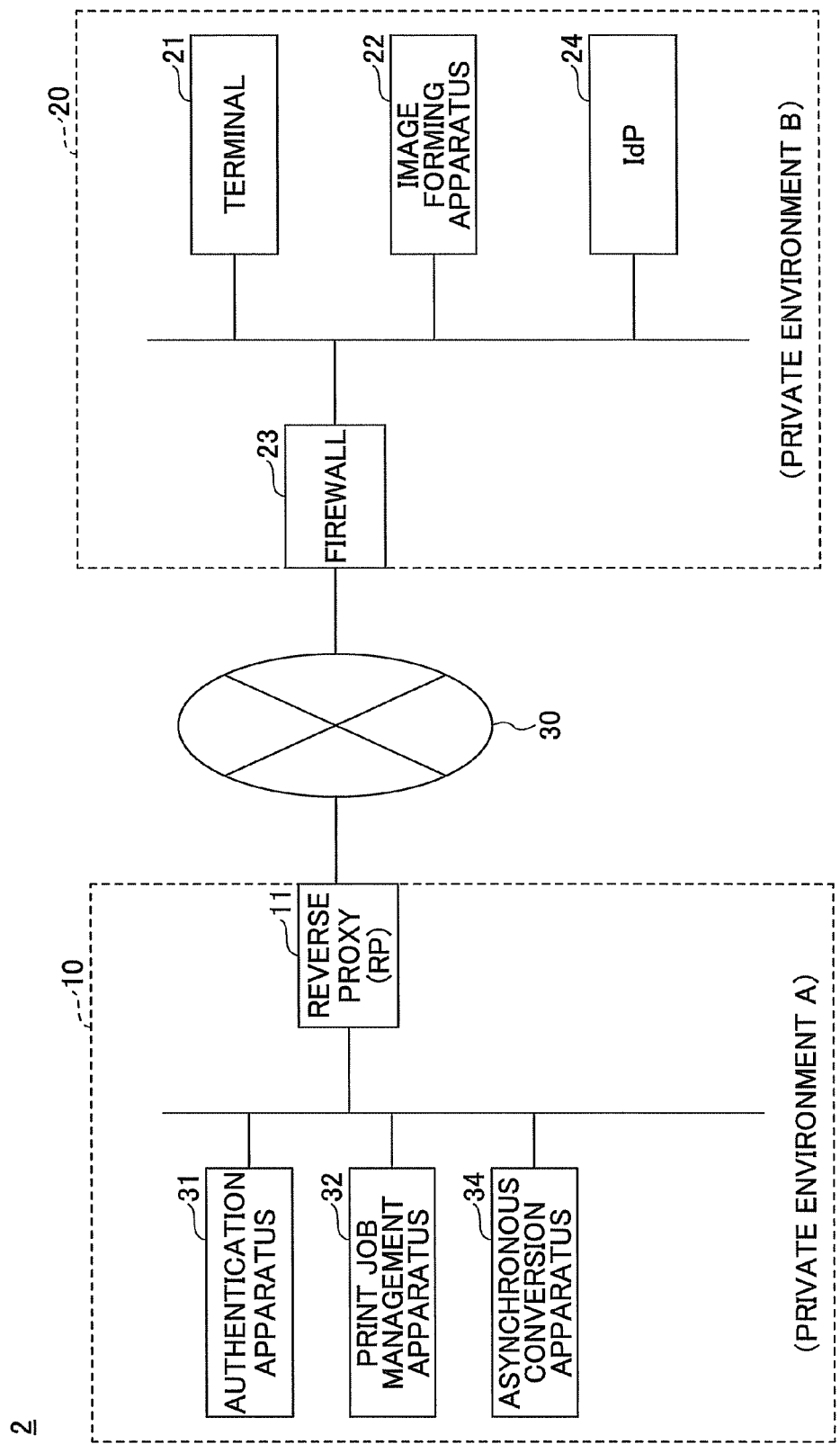
FIG. 12 is a another drawing illustrating an exemplary configuration of a printing system according to the second embodiment.

FIG. 12 is another drawing illustrating an exemplary configuration of the printing system 2 according to the second embodiment. The printing system 2 of FIG. 12 has a configuration similar to the configuration of the printing system 1 of FIG. 2 except that the IdP 24 is added to the network 20. Below, descriptions of components and operations of the printing system 2 that overlap those in the first embodiment may be omitted.

As illustrated in FIG. 12, the network 20 (private environment B) may include the terminal 21, the image forming apparatus 22, the firewall 23, and the IdP 24. The IdP 24 authenticates the user of the terminal 21 and issues an authentication ticket ("assertion") for the terminal 21. The terminal 21 sends a print job including data to be printed to the print job management apparatus 32 by using the authentication ticket.

The IdP 24 also authenticates the user of the image forming apparatus 22 and issues an authentication ticket for the image forming apparatus 22. At the network 10, the authentication apparatus 31 authenticates the user of the image forming apparatus 22 based on the authentication ticket. The authentication apparatus 31 also authenticates the image forming apparatus 22 and an application installed in the image forming apparatus 22 based on a device ID and an application ID.

After the user operating the image forming apparatus 22, the image forming apparatus 22 itself, and the application installed in the image forming apparatus are authenticated, the image forming apparatus 22 receives a print job list, which is a list of receivable print jobs, from the print job management apparatus 32.

Processes performed after the print job list is received by the image forming apparatus 22 are substantially the same as those described in the first embodiment, and their descriptions are omitted here. In the printing system 2, authentication based on user IDs and passwords is performed by the IdP 24 provided in the network 20 and the user IDs and the passwords are transmitted only in the network 20. Similarly to the first embodiment, the second embodiment makes it possible to prevent leakage of information to a third party impersonating an authorized user and thereby maintain the security of the printing system 2.

The IdP 24 of FIG. 12 may have a hardware configuration similar to the hardware configuration illustrated in FIG. 3.

<Processes Performed by Printing System>

Exemplary processes performed by the printing system 2 are described below. Below, descriptions of processes in the printing system 2 that are substantially the same as those in the printing system 1 of the first embodiment may be omitted.

<Information Registration Process>

For example, an administrator having administrative rights of the network 20 accesses a uniform resource locator (URL) of the authentication apparatus 31 by using, for example, a browser of the terminal 21 and registers tables as illustrated in FIGS. 4B and 4C in the authentication DB. Meanwhile, the table of FIG. 4A is registered in an authentication DB (not shown) in the network 20.

With the table of FIG. 4A registered in the authentication DB in the network 20, the user of the terminal 21 and the image forming apparatus 22 can be authenticated by the IdP 24.

With the table of FIG. 4B registered in the authentication DB in the network 10, the image forming apparatus 22 can be authenticated by the authentication apparatus 31. With the table of FIG. 4C registered in the authentication DB in the network 10, the application of the image forming apparatus 22 can be authenticated by the authentication apparatus 31.

<Print Job Registration Process and Printing Process>

A print job registration process and a printing process according to the second embodiment are substantially the same as those in the first embodiment except that authentication by the IdP 24 of the network 20 is performed before authentication by the authentication service unit 12. Therefore, overlapping descriptions may be omitted here.

FIGS. 13A and 13B are parts of a sequence chart illustrating an exemplary print job registration process and an exemplary printing process according to the second embodiment. Here, it is assumed that the printing system 2 is configured as illustrated in FIG. 11. In step S401, the terminal 21 establishes an SSL connection with the reverse proxy 11.

In step S402, the terminal 21 tries to access the print job management service unit 13 via the reverse proxy 11. However, since the terminal 21 has no authentication ticket, the reverse proxy 11 redirects the terminal 21 to a login screen of the IdP 24 in steps S403 and S404.

In step S405, the terminal 21 receives a login screen. The user performs a login operation on the login screen. In step S406, the terminal 21 sends a user ID and a password to the IdP 24. The IdP 24 performs user authentication by referring to the table in the authentication DB provided in the network 20. When the combination of the user ID and the password entered via the terminal 21 is registered in the table of the authentication DB, the IdP 24 determines that the user is an authorized user and the login is successful. When the login is successful, the IdP 24 sends an authentication ticket (assertion) to the terminal 21 in step S407.

In step S408, the terminal 21 with the authentication ticket is automatically forwarded to the authentication service unit 12. The authentication service unit 12 performs user authentication based on the authentication ticket. When the user of the terminal 21 is successfully authenticated, the authentication service unit 12 sends an authentication token to the terminal 21.

Since steps S410 through S415 are substantially the same as steps S308 through S313 of FIG. 7A, their descriptions are omitted here.

Next, the user operating the terminal 21 moves to a location where the image forming apparatus 22 is installed. The user starts an application of the image forming apparatus 22 and enters a user ID and a password.

In step S416, the image forming apparatus 22 sends the user ID and the password to the IdP 24. The IdP 24 performs user authentication by referring to the table in the authentication DB provided in the network 20.

When the combination of the user ID and the password entered via the image forming apparatus 22 is registered in the table of the authentication DB, the IdP 12 determines that the user is an authorized user and the login is successful. When the login is successful, the IdP 24 sends an authentication ticket (assertion) to the image forming apparatus 22 in step S417.

In step S418, the image forming apparatus 22 establishes an SSL connection with the reverse proxy 11 using a client certificate. In step S419, the image forming apparatus 22 sends a company ID, the authentication ticket (assertion), a device ID, and an application ID to the authentication service unit 12.

The authentication service unit 12 confirms the validity of the authentication ticket (user authentication), the validity of the application (application authentication), the validity of the company, and the validity (location or presence) of the image forming apparatus 22 (apparatus authentication).

When the authentication is successful, in step S420, the authentication service unit 12 sends an authentication token to the image forming apparatus 22. Since step S421 and the subsequent steps are substantially the same as step S317 and the subsequent steps of FIG. 7B, their descriptions are omitted here.

<Summary>

In the printing system 2 of the second embodiment, authentication based on user IDs and passwords is performed by the IdP 24 provided in the network 20 (e.g., an internal network of a company), and authentication tickets are sent and received between the network 10 (which provides a cloud service) and the network 20 instead of user IDs and passwords.

In other words, in the printing system 2 of the second embodiment, transmission of user IDs and passwords is kept within the network 20. Similarly to the first embodiment, the second embodiment makes it possible to prevent leakage of information to a third party impersonating an authorized user and thereby makes it possible maintain the security of the printing system 2.

<<Third Embodiment>>

With the configurations of the first and second embodiments, when a user uses an image forming apparatus 22 having a company ID that is different from a company ID associated with the user, authentication of the user fails and the user cannot print a print file even if the image forming apparatus 22 is located in a company to which the user belongs or a company in the same corporate group.

For example, when different company IDs are used at Japanese headquarters of a company A and at a US branch of the company A, a user belonging to the Japanese headquarters cannot print an uploaded print file by using an image forming apparatus 22 located in the US branch of the company A. A third embodiment makes it possible to print a print file on an image forming apparatus 22 having a company ID that is different from a company ID associated with the user.

<System Configuration>

Figure 14:
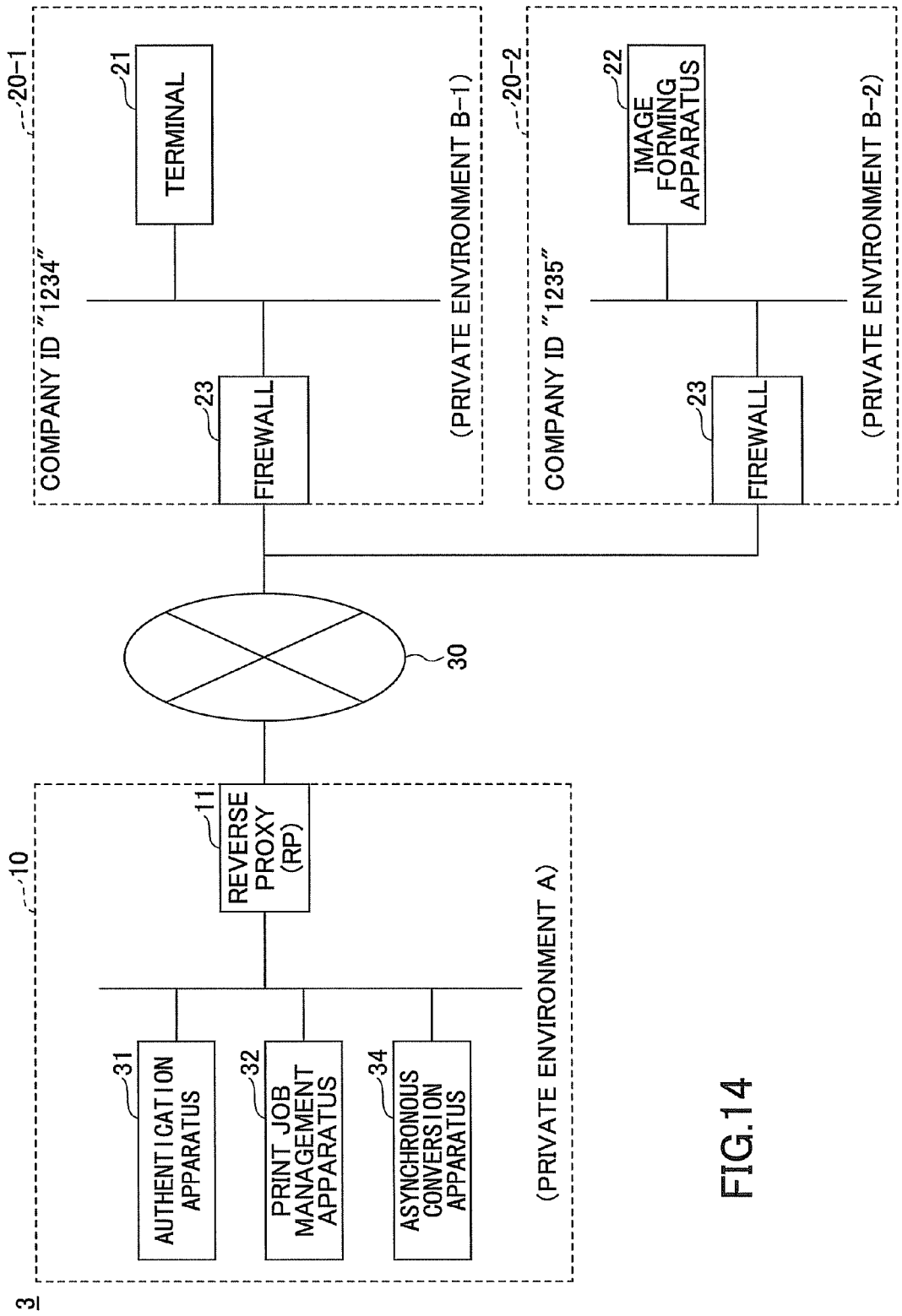
FIG. 14 is a drawing illustrating an exemplary configuration of a printing system according to a third embodiment.

FIG. 14 is a drawing illustrating an exemplary configuration of a printing system 3 according to the third embodiment. In FIG. 14, a network 10 providing a cloud service and networks 20-1 and 20-2, which are, for example, internal networks of companies, are connected to each other via a public network 30 such as the Internet. The network 20-1 (private environment B-1) may include a terminal 21 and a firewall 23. The network 20-2 (private environment B-2) may include an image forming apparatus 22 and a firewall 23.

The printing system 3 of FIG. 14 is similar to the printing system 1 of FIG. 2 except that the terminal 21 and the image forming apparatus 22 are provided separately in the networks 20-1 and 20-2 having different company IDs. Therefore, overlapping descriptions are omitted here.

In the printing system 3, the terminal 21 of the network 20-1 (private environment B-1) and the image forming apparatus 22 of the network 20-2 (private environment B-2) are authenticated by the authentication apparatus 31 of the network 10. As described later in more detail, the authentication apparatus 31 manages company IDs of the same company or the same corporate group by associating them with a corporate group ID.

For example, when authentication of a user operating an image forming apparatus 22 with a company ID "1235" fails, the authentication apparatus 31 determines whether other company IDs are associated with a corporate group ID that is associated with the company ID "1235".

Here, it is assumed that a company ID "1234" is also associated with the corporate group ID associated with the company ID "1235". In this case, the authentication apparatus 31 performs user authentication using the company ID "1234" instead of the company ID "1235". When the user is associated with the corporate ID "1234", the user is successfully authenticated.

Thus, according to the third embodiment, a user can be successfully authenticated and can print a print file even when the company ID (e.g., "1234") of the user is different from the company ID (e.g., "1235") of the image forming apparatus 22 being operated by the user as long as the company IDs are associated with the same corporate group ID.

Processes other than a user authentication process performed in the printing system 3 of the third embodiment are substantially the same as those performed in the printing system 1 of the first embodiment, and their descriptions are omitted here. In the printing system 3, a user can print a print file using an image forming apparatus 22 (or any other device) that is located in a company to which the user belongs or a company in the same corporate group even if the company ID of the image forming apparatus 22 is different from the company ID of the user.

Here, even in the printing system 3, a user is not successfully authenticated if the company ID (e.g., "1234") of the user is different from the company ID (e.g., "1235") of the image forming apparatus 22 being operated by the user and the company ID of the user (e.g., "1234") is not associated with the same corporate group ID associated with the company ID (e.g., "1235") of the image forming apparatus 22. Thus, similarly to the first embodiment, the third embodiment also makes it possible to prevent leakage of information to a third party impersonating an authorized user and thereby maintain the security of the printing system 3.

<Processes Performed by Printing System>

Exemplary processes performed by the printing system 3 are described below. Below, descriptions of processes in the printing system 3 that are substantially the same as those in the printing system 1 of the first embodiment may be omitted.

<Information Registration Process>

For example, an administrator having administrative rights of the network 20 accesses a uniform resource locator (URL) of the authentication apparatus 31 by using, for example, a browser of the terminal 21 and registers tables as illustrated in FIGS. 15A through 15D.

FIGS. 15A through 15D are exemplary tables registered in the authentication DB according to the third embodiment. The tables of FIGS. 15A through 15C are substantially the same as the tables of FIGS. 4A through 4C, and therefore their descriptions are omitted here. The table of FIG. 15D stores company IDs of the same company or companies belonging to the same corporate group in association with a corporate group ID.

In the example of FIG. 15D, company IDs "1234", "1235", and "1236" are associated with a corporate group ID "G01". With the table of FIG. 15D registered in the authentication DB, for example, a user having the company ID "1234" and operating an image forming apparatus 22 with the company ID "1235" can be successfully authenticated.

<Print Job Registration Process and Printing Process>

A print job registration process of the third embodiment is substantially the same as the print job registration process of the first embodiment, and therefore its description is omitted here. A printing process of the third embodiment is different from the printing process of the first embodiment in step S12 (user authentication process) of FIG. 6. Other steps are substantially the same, and their descriptions are omitted here.

Figure 16:
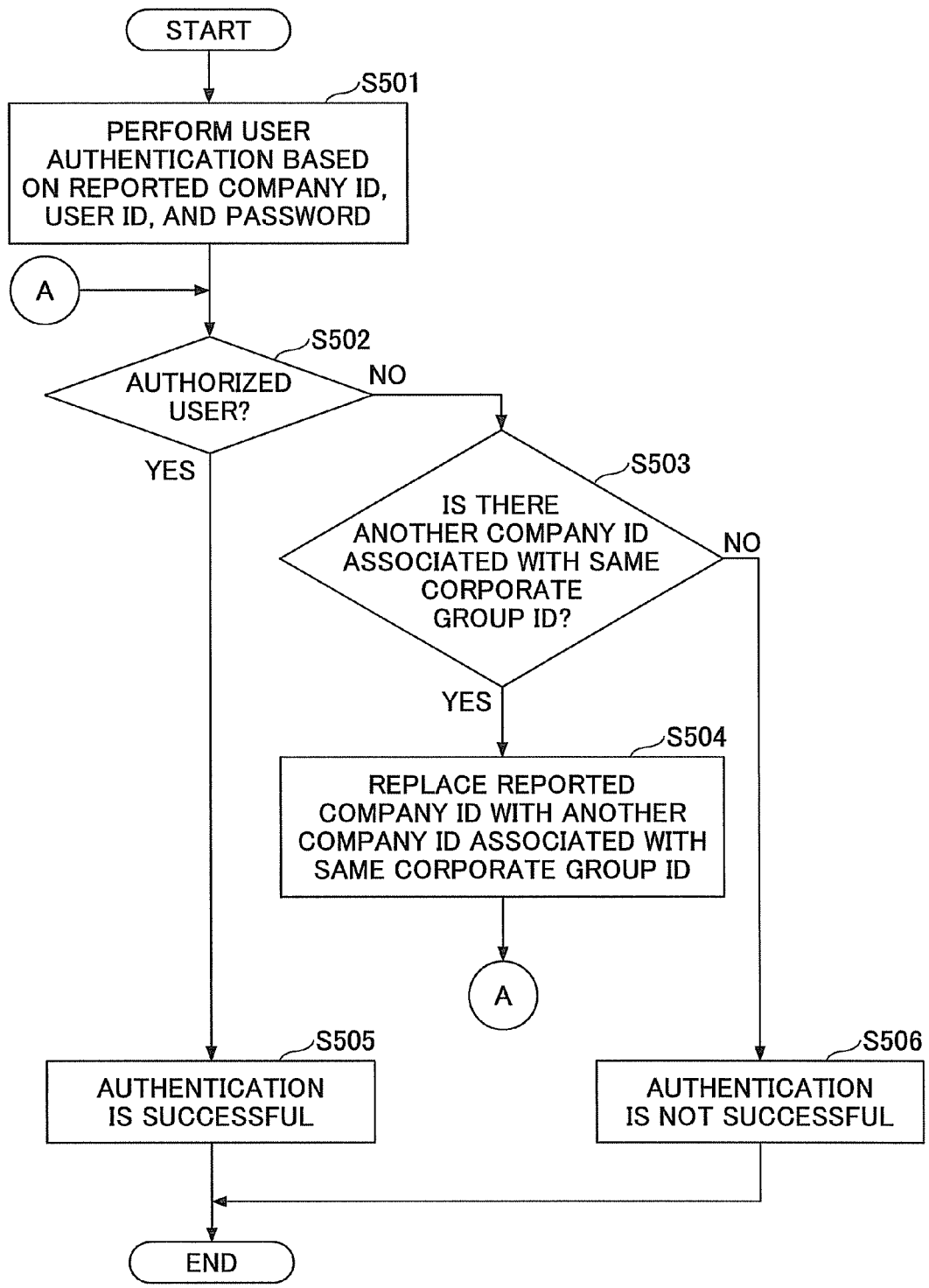
FIG. 16 is a flowchart illustrating an exemplary user authentication process.

FIG. 16 is a flowchart illustrating an exemplary user authentication process. In step S501 of FIG. 16, the authentication apparatus 31 performs authentication of a user by referring to the table of FIG. 15A based on a user ID, a password, and a company ID sent from the image forming apparatus 22.

In step S502, when the combination of the user ID, the password, and the company ID sent from the image forming apparatus 22 is registered in the table of FIG. 15A (or the authentication DB), the authentication apparatus 31 determines that the user is an authorized user. When the user is an authorized user, the authentication apparatus 31 determines, in step S505, that the authentication is successful.

For example, when a user with a company ID "1235" requests authentication from an image forming apparatus 22 with a company ID "1235", the authentication apparatus 31 determines that the user is an authorized user and the authentication is successful.

Meanwhile, when the combination of the user ID, the password, and the company ID sent from the image forming apparatus 22 (in the descriptions below, this company ID may be referred to as a "reported company ID") is not registered in the table of FIG. 15A in step S502, the authentication apparatus 31 proceeds to step S503.

For example, when a user with a company ID "1234" requests authentication from an image forming apparatus 22 with a company ID "1235", the authentication apparatus 31 proceeds to step S503. In step S503, the authentication apparatus 31 refers to the table of FIG. 15D to determine whether a company ID other than the reported company ID is registered in association with a corporate group ID associated with the reported company ID (i.e., whether another company ID is registered in the same record as the reported company ID).

For example, when the reported company ID is "1235" that is associated with the corporate group ID "G01", the authentication apparatus 31 determines that the company ID "1234" is also associated with the corporate group ID "G01". When there is another company ID associated with a corporate group ID that is associated with the reported company ID, the authentication apparatus 31 replaces the reported company ID with the other company ID in step S504 and returns to step S502 to perform user authentication again.

For example, the authentication apparatus 31 replaces the reported company ID "1235" with another company ID "1234" associated with the same corporate group ID "G01" in step S504 and performs user authentication again in step S502. When the company ID of the user is "1234", the user is successfully authenticated.

Step S504 may also be performed in a different manner. For example, when there is another company ID associated with the same corporate group ID as the reported company ID, the authentication apparatus 31 may be allowed to switch to another authentication DB including the other company ID and perform user authentication using the other authentication DB.

If no other company ID associated with the same corporate group ID as the reported company ID is found in step S503, the authentication apparatus 31 determines that the user is not an authorized user and the authentication is not successful. Steps following the user authentication are substantially the same as those described with reference to FIG. 6 in the first embodiment, and therefore their descriptions are omitted here.

<Summary>

In the printing system 3 of the third embodiment, a user can print a print file on an image forming apparatus 22 with a company ID different from the company ID of the user if those company IDs are associated with the same corporate group ID. Thus, the printing system 3 of the third embodiment allows the user to print or process files on devices with different company IDs by associating the company IDs with each other.

For example, even when different company IDs are used at Japanese headquarters of a company A and at a US branch of the company A, a user belonging to the Japanese headquarters can print an uploaded print file by using an image forming apparatus 22 located in the US branch of the company A.

<<Fourth Embodiment>>

A fourth embodiment employs a method or mechanism different from the third embodiment to achieve substantially the same effect. In the fourth embodiment, the printing system 3 used in the third embodiment is also used and therefore descriptions of the system configuration are omitted.

<Processes Performed by Printing System>

Exemplary processes performed by the printing system 3 according to the fourth embodiment are described below. Below, descriptions of processes in the printing system 3 of the fourth embodiment that are substantially the same as those in the printing system 3 of the third embodiment may be omitted.

<Information Registration Process>

An information registration process according to the fourth embodiment is substantially the same as the information registration process in the first embodiment. That is, in the fourth embodiment, it is not necessary to register the table of FIG. 15D that stores company IDs of companies belonging to corporate groups in association with the corresponding corporate group IDs.

<Print Job Registration Process and Printing Process>

A print job registration process of the fourth embodiment is substantially the same as the print job registration process of the first embodiment, and therefore its description is omitted here. A printing process of the fourth embodiment is different from the printing process of the first embodiment in step S315 of FIG. 7B. Other steps are substantially the same, and their descriptions are omitted here.

In step S315 in the printing process of the fourth embodiment, the image forming apparatus 22 sends a company ID for device authentication, a company ID for user authentication, a user ID, a password, a device ID, and an application ID to the authentication service unit 12. Thus, in the fourth embodiment, different from the first embodiment, two company IDs for device authentication and user authentication are sent from the image forming apparatus 22.

The authentication service unit 12 confirms the validity of the company and the validity (location or presence) of the image forming apparatus 22 (device authentication) based on the company ID for device authentication. The authentication service unit 12 also performs user authentication based on the company ID for user authentication. More specifically, the authentication service unit 12 performs user authentication by referring to the table of FIG. 4A (authentication DB) based on the user ID, the password, and the company ID for user authentication sent from the image forming apparatus 22.

The company ID for user authentication may be entered by the user, for example, on the same screen of the image forming apparatus 22 for entering the user ID and the password. In this case, however, even a user with a company ID that is the same as the company ID of the image forming apparatus 22 may also need to enter the company ID for user authentication on the screen of the image forming apparatus 22 for entering the user ID and password.

In the printing system 3 of the fourth embodiment, to improve the convenience of the user, a screen for a user with a company ID that is the same as the company ID of the image forming apparatus 22 is provided separately from a screen for a user with a company ID that is different from the company ID of the image forming apparatus 22.

Alternatively, one screen may be shared by a user with a company ID that is the same as the company ID of the image forming apparatus 22 and a user with a company ID that is different from the company ID of the image forming apparatus 22. In this case, whether a user has a company ID that is the same as the company ID of the image forming apparatus 22 is determined based on whether a company ID for user authentication is entered by the user.

Steps following step S316 are substantially the same as those in the first embodiment, and therefore their descriptions are omitted here.

<Summary>

The printing system 3 of the fourth embodiment allows a user to print or process a file on an image forming apparatus 22 with a company ID different from the company ID of the user by sending both of the company IDs for device authentication and user authentication from the image forming apparatus 22.

<<Fifth Embodiment>>

In a fifth embodiment, a mechanism for determining whether a company ID for device authentication and a company ID for user authentication are associated with the same corporate group ID is added to the mechanism of the fourth embodiment. In the fifth embodiment, the printing system 3 used in the third embodiment is also used and therefore descriptions of the system configuration are omitted.

<Processes Performed by Printing System>

Exemplary processes performed by the printing system 3 according to the fifth embodiment are described below. Below, descriptions of processes in the printing system 3 of the fifth embodiment that are substantially the same as those in the printing system 3 of the fourth embodiment may be omitted.

<Information Registration Process>

An information registration process according to the fifth embodiment is substantially the same as the information registration process in the third embodiment. That is, in the fifth embodiment, the table of FIG. 15D, which stores company IDs of companies belonging to corporate groups in association with the corresponding corporate group IDs, is registered in the authentication DB.

<Print Job Registration Process and Printing Process>

A print job registration process of the fifth embodiment is substantially the same as the print job registration process of the fourth embodiment, and therefore its description is omitted here. A printing process of the fifth embodiment is different from the printing process of the fourth embodiment in the user authentication process performed in step S315 of FIG. 7B. Other steps are substantially the same, and their descriptions are omitted here.

In the printing process of the fifth embodiment, a user authentication process is performed as illustrated in FIG. 17. FIG. 17 is a flowchart illustrating an exemplary user authentication process according to the fifth embodiment.

In step S601 of FIG. 17, the authentication apparatus 31 performs user authentication by referring to the table of FIG. 15A based on a user ID, a password, and a company ID for user authentication sent from the image forming apparatus 22.

In step S602, when the combination of the user ID, the password, and the company ID for user authentication sent from the image forming apparatus 22 is registered in the table of FIG. 15A (or the authentication DB), the authentication apparatus 31 determines that the user is an authorized user. When the user is an authorized user, the authentication apparatus 31 proceeds to step S603.

In step S603, the authentication apparatus 31 determines whether the company ID for user authentication and a company ID for device authentication sent from the image forming apparatus 22 are associated with the same corporate group ID by referring to the table of FIG. 15D.

When the company ID for user authentication and the company ID for device authentication are associated with the same corporate group ID, the authentication apparatus 31 determines, in step S604, that the authentication is successful.

Meanwhile, when it is determined, in step S602, that the combination of the user ID, the password, and the company ID for user authentication sent from the image forming apparatus 22 is not registered in the table of FIG. 15A, the authentication apparatus 31 determines, in step S605, that the user is not an authorized user and the authentication is not successful.

Also, when the company ID for user authentication and the company ID for device authentication are not associated with the same corporate group ID in step S603, the authentication apparatus 31 determines, in step S605, that the user is not an authorized user and the authentication is not successful.

<Summary>

In the printing system 3 of the fifth embodiment, a company ID for device authentication and a company ID for user authentication are sent from the image forming apparatus 22 to the authentication apparatus 31 and the authentication apparatus 31 determines whether the company ID for device authentication and the company ID for user authentication are associated with the same corporate group ID. This configuration improves the security in a case where a user tries to print or process a file on an image forming apparatus 22 with a company ID different from the company ID of the user.

The present invention is not limited to the specifically disclosed embodiments, and variations and modifications may be made without departing from the scope of the present invention.

In the printing systems 1-3 of the above embodiments, the authentication service unit 12, the print job management service unit 13, and the asynchronous conversion service unit 15 are implemented, respectively, as the authentication apparatus 31, the print job management apparatus 32, and the asynchronous conversion apparatus 34, i.e., by separate information processing apparatuses 100. However, the present invention is not limited to the above described configurations.

For example, two or more of the authentication service unit 12, the print job management service unit 13, and the asynchronous conversion service unit 15 may be implemented by one information processing apparatus 100.

Also in the above embodiments, the image forming apparatus 22 is used as an example of a device. However, the present invention may also be applied to any other device such as a projector or a scanner that inputs and outputs image data. The image forming apparatus 22 may be configured to output (or print) an image on various media in addition to or other than paper.

A company ID may be referred to as an "organization ID", an "organization identifier", or "organization identification information". That is, a company ID (or an organization ID, an organization identifier, or organization identification information) is not limited to identification information for identifying a company, but may also represent identification information for identifying any other type of organization or group. Here, an "organization" is not limited to a company or a university, but may indicate a group of users or devices of any type. Further, identification information for identifying a contract for a group of users or devices may be used as a company ID (or an organization ID, an organization identifier, or organization identification information).

In the above embodiments, each of the printing systems 1-3 basically includes the terminal 21 for requesting registration of a job, the image forming apparatus 22 for outputting the job, and the information processing apparatus 100 that are connected to each other for communications. The information processing apparatus 100 basically includes a function for converting electronic data (i.e., data to be processed in a job) sent from the terminal 21 into a format (e.g., print data for a printer or display data for a display) that the image forming apparatus 22 (or any other device) can process. The present invention may be applied to, but is not limited to, any system having such a basic configuration.

Company codes/IDs (organization identification information or first/second organization identifiers), user IDs (user identification information or first/second user identifiers), and passwords are registered in advance by a user such as an administrator. For example, an administrator sends company codes, user IDs, and passwords from an administrator terminal to the authentication service unit 12 (or the authentication apparatus 31) to request their registration. A registration unit (not shown) of the authentication service unit 12 registers the company codes, the user IDs, and the passwords in the authentication DB. The registration unit is configured to not register plural sets of the same combination of a user ID and a password in association with one company code.

For example, when receiving a new registration request, the registration unit determines whether a matching combination, which matches the combination of a company code, a user ID, and a password in the new registration request (which may be referred to as a "requested combination"), is present in the already-registered combinations (or records) in the authentication DB. When a matching combination is found in the authentication DB, the registration unit reports it to the administrator terminal without registering the requested combination in the authentication DB.

Alternatively, the registration unit may be configured to display a confirmation screen to ask the administrator whether to overwrite the matching combination with the requested combination. When the administrator chooses to overwrite the matching combination, the registration unit overwrites the matching combination with the requested combination.

Meanwhile, when receiving an overwrite registration request, the registration unit determines whether a matching combination that matches the requested combination is present in the already-registered combinations (or records) in the authentication DB. When a matching combination is found, the registration unit overwrites the matching combination with the requested combination. Meanwhile, when no matching combination is found, the registration unit displays a confirmation screen to ask the administrator whether to register the requested combination as a new record or registers the requested combination without displaying the confirmation screen.

In the meantime, the same combination of a user ID and a password may be registered in association with different company codes. For this reason, the registration unit is preferably configured to first identify an already-registered company code that matches a received company code and then determine whether a received combination of a user ID and a password is present in already-registered combinations of user IDs and passwords associated with the identified company code.

This configuration makes it possible to more efficiently determine the presence of a matching combination compared with a configuration where the registration unit first identifies already-registered combinations of user IDs and passwords that match the received combination of a user ID and a password and then determines whether the company codes associated with the identified combinations match the received company code.

In the present application, external apparatuses may correspond to the terminal 21 and the image forming apparatus 22; an information processing system may correspond to any one of the printing systems 1-3; first and second receiving units may correspond to the print job management apparatus 32; first and second authentication units may correspond to the authentication apparatus 31; a storage unit may correspond to the authentication DB; and an output data receiving unit, an output data recording unit, and first and second output data transmitting units may correspond to the print job management apparatus 32.

An aspect of this disclosure provides an information processing system, an information processing apparatus, and an authentication method that make it possible to improve security.

What is claimed is:

1. An information processing system implemented by one or more information processing apparatuses, the information processing system comprising:
   a memory that stores a program; and
   one or more processors that execute the program stored in the memory to perform a process including
      receiving a user identifier and an organization identifier from a terminal, the terminal sending an output job to the information processing system after the user identifier and the organization identifier are authenticated by the information processing system, and
      receiving an application identifier, a device identifier, the user identifier, and the organization identifier from an image forming apparatus, the application identifier identifying an application installed in the image forming apparatus, the device identifier identifying the image forming apparatus and being stored in the image forming apparatus, the image forming apparatus outputting the output job sent to the information processing system by the terminal after the application identifier, the device identifier, the user identifier, and the organization identifier are authenticated by the information processing system;
      performing first authentication in response to the reception of the user identifier and the organization identifier from the terminal based on user information stored in an information storage, the user information associating each of organization identifiers with user identifiers; and
      performing second authentication in response to the reception of the application identifier, the device identifier, the user identifier, and the organization identifier from the image forming apparatus based on device information and the user information, the device information associating each of the organization identifiers with device identifiers,
   wherein
   the first authentication is performed by searching the user information for a corresponding organization identifier corresponding to the received organization identifier and then comparing the received user identifier with the user identifiers associated with the corresponding organization identifier; and
   the second authentication includes
      performing application authentication based on whether the received application identifier is registered in the information storage,
      searching the device information and the user information for the corresponding organization identifier corresponding to the received organization identifier,
      performing device authentication by comparing the received device identifier with the device identifiers associated with the corresponding organization identifier,
      performing user authentication by comparing the received user identifier with the user identifiers associated with the corresponding organization identifier, and determining that the second authentication is successful when all of the application authentication, the device authentication, and the user authentication are successful.

2. The information processing system as claimed in claim 1, wherein the process further includes receiving first output data from the terminal when the first authentication for the user identifier and the organization identifier received from the terminal is successful;

recording the first output data or second output data generated based on the first output data in a data storage in association with the user identifier and the organization identifier received from the terminal;

retrieving, from the data storage, the first output data or the second output data associated with the user identifier and the organization identifier received from the image forming apparatus; and sending the retrieved first output data or second output data to the image forming apparatus when the second authentication for the application identifier, the device identifier, the organization identifier, and the user identifier received from the image forming apparatus is successful.

3. The information processing system as claimed in claim 2, wherein in the sending the first output data is sent to the image forming apparatus when the first output data is in a format supported by the image forming apparatus; and the second output data, which is obtained by converting the first output data into the format supported by the image forming apparatus, is sent to the image forming apparatus when the first output data is not in the format supported by the image forming apparatus.

4. The information processing system as claimed in claim 2, wherein the information storage further stores group identifiers associated with the organization identifiers; and wherein when the second authentication for the application identifier, the device identifier, the user identifier, and the organization identifier received from the image forming apparatus is successful, the sending sends, to the image forming apparatus, the first output data or the second output data that is associated with the user identifier received from the image forming apparatus and an organization identifier associated with the same group identifier as that associated with the organization identifier received from the image forming apparatus.

5. The information processing system as claimed in claim 2, wherein another organization identifier is received from the image forming apparatus in addition to the application identifier, the device identifier, the organization identifier, and the user identifier; and wherein when the second authentication for the application identifier, the device identifier, the user identifier, and the organization identifier received from the image forming apparatus is successful, the sending sends, to the image forming apparatus, the first output data or the second output data that is associated with the user identifier and the other organization identifier received from the image forming apparatus.

6. The information processing system as claimed in claim 2, wherein another organization identifier is received from the image forming apparatus in addition to the application identifier, the device identifier, the organization identifier, and the user identifier; and wherein when the second authentication for the application identifier, the device identifier, the user identifier, and the organization identifier received from the image forming apparatus is successful and the first authentication for the user identifier and the other organization identifier received from the image forming apparatus is successful, the sending sends, to the image forming apparatus, the first output data or the second output data that is associated with the user identifier and the other organization identifier received from the image forming apparatus.

7. The information processing system as claimed in claim 1, wherein the organization identifiers identify groups of users; and wherein the process further includes registering the user identifiers in association with the organization identifiers in the information storage such that plural sets of the same user identifier are not registered in association with one organization identifier.

8. The information processing system as claimed in claim 1, wherein the organization identifiers identify groups of users; and wherein the process further includes registering the user identifiers and passwords in association with the organization identifiers in the information storage such that plural sets of a same combination of a user identifier and a password are not registered in association with one organization identifier.

9. An information processing apparatus connected via a network to a terminal, the information processing apparatus comprising:

a memory that stores a program; and one or more processors that execute the program stored in the memory to perform a process including receiving a user identifier and an organization identifier from the terminal, the terminal sending an output job to the information processing apparatus after the user identifier and the organization identifier are authenticated by the information processing apparatus, and receiving an application identifier, a device identifier, the user identifier, and the organization identifier from an image forming apparatus, the application identifier identifying an application installed in the image forming apparatus, the device identifier identifying the image forming apparatus and being stored in the image forming apparatus, the image forming apparatus outputting the output job sent to the information processing apparatus by the terminal after the application identifier, the device identifier, the user identifier, and the organization identifier are authenticated by the information processing apparatus;

performing first authentication in response to the reception of the user identifier and the organization identifier from the terminal based on user information stored in an information storage, the user information associating each of organization identifiers with user identifiers; and performing second authentication in response to the reception of the application identifier, the device identifier, the user identifier, and the organization identifier from the image forming apparatus based on device information and the user information, the device information associating each of the organization identifiers with device identifiers, wherein the first authentication is performed by searching the user information for a corresponding organization identifier corresponding to the received organization identifier and then comparing the received user identifier with the user identifiers associated with the corresponding organization identifier; and the second authentication includes performing application authentication based on whether the received application identifier is registered in the information storage, searching the device information and the user information for the corresponding organization identifier corresponding to the received organization identifier, performing device authentication by comparing the received device identifier with the device identifiers associated with the corresponding organization identifier, performing user authentication by comparing the received user identifier with the user identifiers associated with the corresponding organization identifier, and determining that the second authentication is successful when all of the application authentication, the device authentication, and the user authentication are successful.

10. A method performed by an information processing system implemented by one or more information processing apparatuses, the method comprising:

receiving, by one or more processors, a user identifier and an organization identifier via a network from a terminal, the terminal sending an output job to the information processing system after the user identifier and the organization identifier are authenticated by the information processing system;

receiving, by the one or more processors, an application identifier, a device identifier, the user identifier, and the organization identifier from an image forming apparatus, the application identifier identifying an application installed in the image forming apparatus, the device identifier identifying the image forming apparatus and being stored in the image forming apparatus, the image forming apparatus outputting the output job sent to the information processing system by the terminal after the application identifier, the device identifier, the user identifier, and the organization identifier are authenticated by the information processing system;

performing, by the one or more processors, first authentication in response to the reception of the user identifier and the organization identifier from the terminal based on user information stored in an information storage, the user information associating each of organization identifiers with user identifiers; and performing, by the one or more processors., second authentication in response to the reception of the application identifier, the device identifier, the user identifier, and the organization identifier from the image forming apparatus based on device information and the user information, the device information associating each of the organization identifiers with device identifiers, wherein the first authentication is performed by searching the user information for a corresponding organization identifier corresponding to the received organization identifier and then comparing the received user identifier with the user identifiers associated with the corresponding organization identifier; and the second authentication includes performing application authentication based on whether the received application identifier is registered in the information storage, searching the device information and the user information for the corresponding organization identifier corresponding to the received organization identifier, performing device authentication by comparing the received device identifier with the device identifiers associated with the corresponding organization identifier, performing user authentication by comparing the received user identifier with the user identifiers associated with the corresponding organization identifier, and determining that the second authentication is successful when all of the application authentication, the device authentication, and the user authentication are successful.

\* \* \* \* \*